W. J. CRUMPTON.
ACCOUNTING SYSTEM.
APPLICATION FILED JUNE 27, 1914.
1,237,620.
Patented Aug. 21, 1917.
3 SHEETS—SHEET 2.
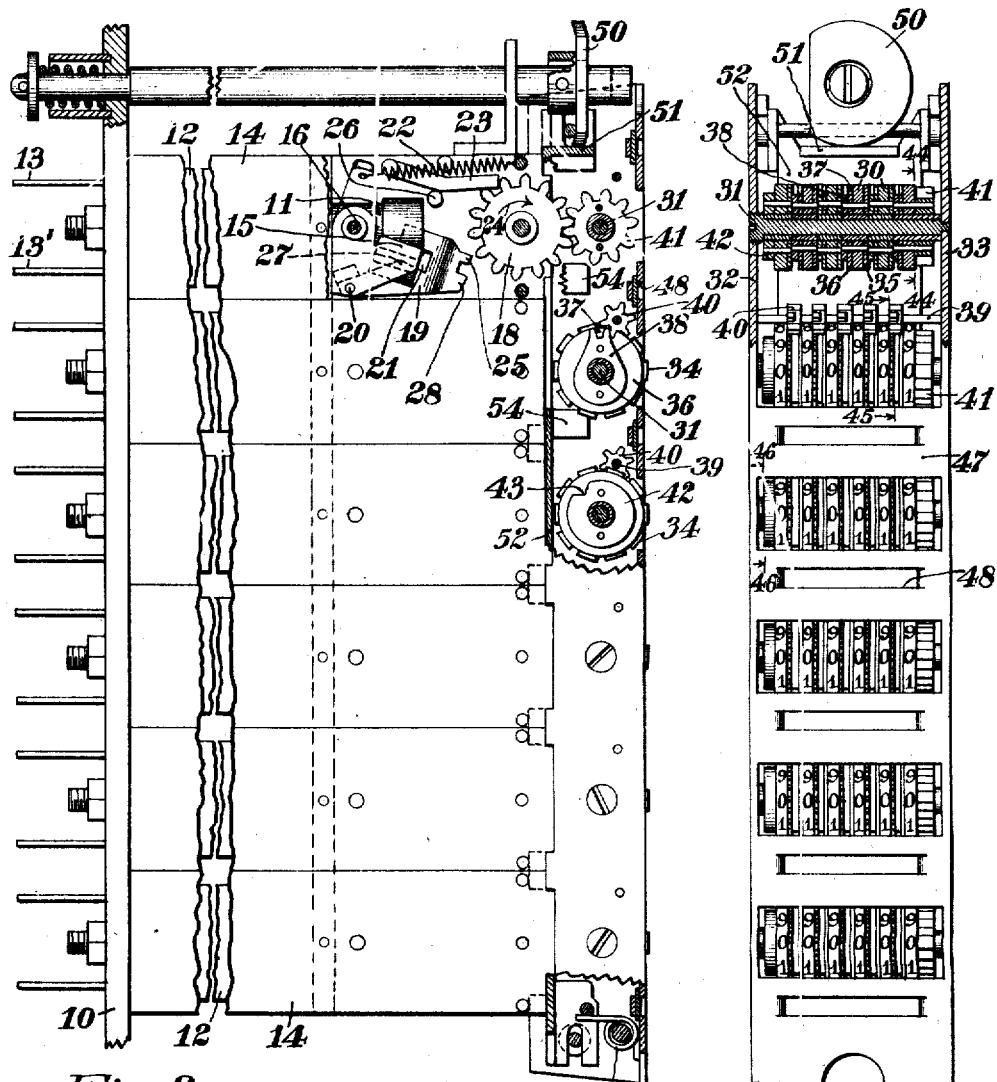
Fig. 2.
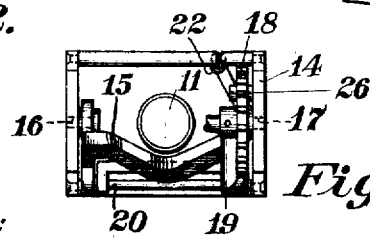
Fig. 5.
Fig. 3.
Witnesses:
Inventor
William J. Crumpton
By
Attorney.

W. J. CRUMPTON.
ACCOUNTING SYSTEM.
APPLICATION FILED JUNE 27, 1914.
1,237,620.
Patented Aug. 21, 1917.
3 SHEETS—SHEET 3.
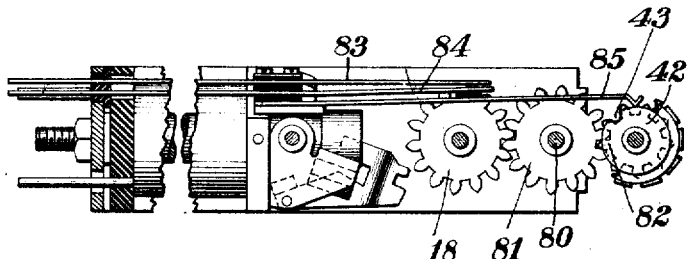
Fig. 6.
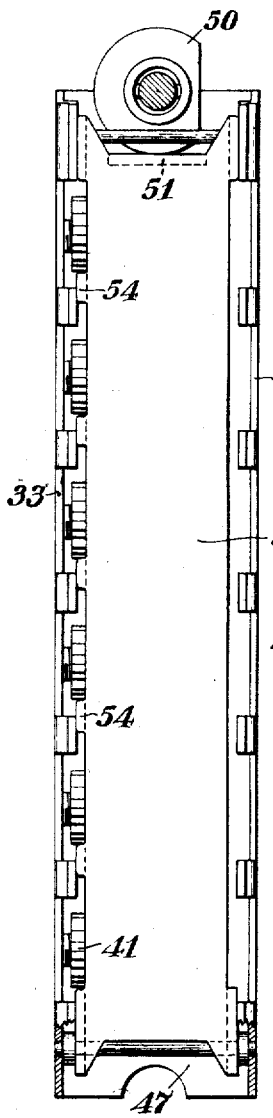
Fig. 4.
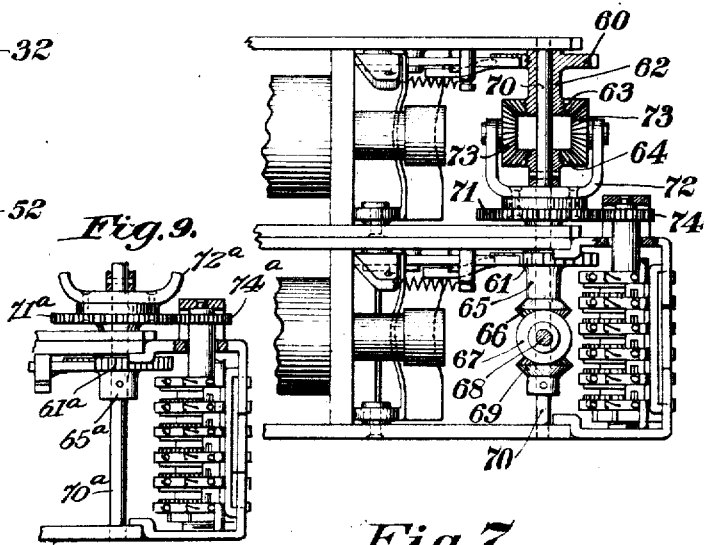
Fig. 9.
Fig. 7.
Fig. 8.
Witnesses:
Albin E. Ahlberg
Robert F. Bracke
Inventor
William J. Crumpton
By Lynn A. Williams
Attorney.

UNITED STATES PATENT OFFICE.

WILLIAM J. CRUMPTON, OF EVANSTON, ILLINOIS, ASSIGNOR TO WILLIAM R. HEATH, OF BUFFALO, NEW YORK.

ACCOUNTING SYSTEM.

1,237,620.  Specification of Letters Patent.  Patented Aug. 21, 1917.

Application filed June 27, 1914. Serial No. 847,630.

*To all whom it may concern:*

Be it known that I, WILLIAM J. CRUMPTON, a citizen of the United States, residing at Evanston, in the county of Cook and State of Illinois, have invented certain new and useful Improvements in Accounting Systems, of which the following is a full, clear, concise, and exact description, reference being had to the accompanying drawings, forming a part of this specification.

My invention relates to accounting and tabulating systems and mechanism and is particularly adapted for use in accounting for the cost of production in industrial works. In accordance with the prior art, such accounting has been accomplished mentally and manually. In accordance with my invention, the calculations are made automatically. In a large measure the data upon which the calculations are based are furnished automatically to the mechanism. Broadly considered, the results accomplished by the use of the system of my invention are as follows:

(1) To keep and make a record of each individual workman's time;

(2) To totalize the workmen's time;

(3) To calculate and record each individual workman's wages;

(4) To calculate and exhibit in tabular form the departmental grand totals of wages;

(5) To calculate the cost of each job in process through the works, the calculation including the labor cost in each department, the cost of operating the machines necessary to perform the mechanical operations, the cost on account of overhead expenses commonly designated "burden," the cost of material, and calculation of appropriate totals as applied to each job in process;

(6) To calculate and totalize automatically similarly detailed costs of all jobs in process in the works;

(7) To calculate and totalize the detail costs of all finished jobs passing out of the establishment;

(8) To calculate and totalize automatically similarly detailed costs of all jobs in process;

(9) To calculate and totalize in similar detail all expenses of production.

With this brief statement of the results to be accomplished, I shall proceed with a description of the mechanism before attempting to summarize some of the features of invention involved in the mechanism and its operation. In describing the mechanism, I shall refer to the accompanying drawings, in which Figure 1 is a diagram showing the mechanism and the electrical connections between the various pieces of mechanism employed;

Fig. 2 is a side view of a set of electromagnetically-actuated totalizers;

Fig. 3 is a front view thereof;

Fig. 4 is a rear elevation of a set of registers;

Fig. 5 is a front elevation of one unit of the electromagnetic register actuating mechanism;

Fig. 6 is a side elevation illustrating the special details of an electromagnetic resetting mechanism;

Fig. 7 is a plan view of a portion of a differentially driven register member, and Fig. 8 is a detail view of the wage and burden selector commutators and their plug and jack connections.

Fig. 9 illustrates in fragmentary elevation a register member generally similar to the register member of Fig. 7 except that the mechanism of Fig. 9 is mechanically cumulative as distinguished from mechanically differential.

Figure 1:
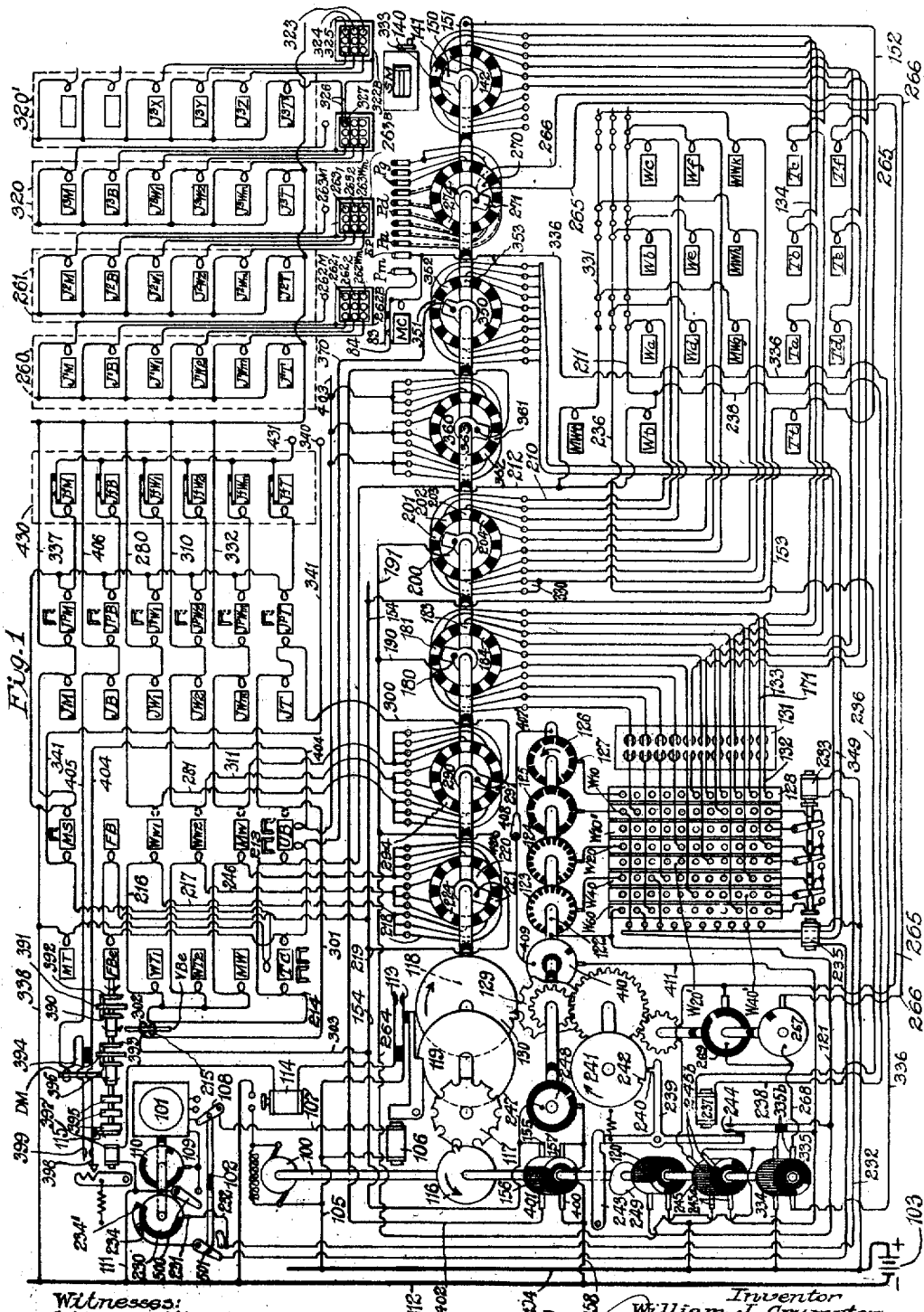

The mechanism shown in Figs. 2 to 5 inclusive is frequently duplicated throughout the system and may, therefore, be regarded as a standard electromagnetically-actuated register set. This mechanism comprises a mounting plate 10, to which is bolted a set of six electromagnets, each electromagnetic member comprising an iron core 11 surrounded by a coil of insulated wire 12, the terminals of which are shown at 13, 13', and a U-shaped iron or steel yoke piece 14.

An armature 15 is pivoted in either side of the yoke piece as illustrated at 16, 17. As best illustrated in Fig. 5, the armature is bent downwardly around the forward end of the core of the electromagnet, wherefore the energization of the electromagnet, by the passage of a current of electricity therethrough, will cause the upward movement of the forward end of the armature, the forward end of the armature being attracted toward the under side of the core of the electromagnet.

It is the purpose of the armature, upon the energization of the magnet, to cause the associated idler gear 18 to be revolved the space of one tooth. The armature proper is, therefore, provided with an actuating pawl 19, pivoted to the armature at 20 and provided with a notch 21 which embraces one side of the armature proper, it being noted in this connection that the notch 21 is somewhat wider than the thickness of the metal of the armature itself. A spring 22 acts upon a projection of the armature to return the armature to the position shown in Figs. 2 and 5 upon the deënergization of the electromagnet. A pivoted dog 23, acting between appropriate stops, prevents the idler 18 from rotating in a direction opposite from that indicated by the arrow 24.

It will be seen that the upward movement of the armature, upon the energization of the magnet, will cause the forward and upward movement of the tooth 25 of the actuating pawl 19, and that the tooth 25 will engage between adjacent teeth of the idler 18 to cause the one-step advancement of the wheel 18, as indicated by the arrow 24. The downward swing of the actuating pawl is limited by a stop 26. Upon the deënergization of the magnet, the armature will be retracted by the spring 22 and, as the dog 23 prevents the backward rotation of the gear 18, the teeth of the actuating pawl 19 will be withdrawn from the teeth of the idler, thereby permitting the actuating pawl to drop back into its normal position as shown in Fig. 2. It will be apparent that there must be some play between the armature and the actuating pawl pivoted thereto in order to permit of this withdrawal, and this play properly limited is provided by the distance between the projection 27 at the lower side of the notch of the actuating pawl and the armature which is embraced by the notch. The enlarged tooth 28 at the end of the actuating pawl aids in preventing any overthrow of the idler upon the energization of the electromagnet and also takes a large part of the wear which would otherwise fall upon the tooth 25. Fig. 2 indicates six electromagnets all alike and all provided with idlers and armature mechanism such as that illustrated in detail at the top of the figure.

We come now to a consideration of the register mechanism which is operated by electromagnetic actuators such as those previously described. Six such register mechanisms are mounted in a single bank or set, as illustrated in Figs. 2, 3 and 4. The units, tens, hundreds, etc., numeral-wheels 30, 30 are mounted on spindles 31, 31, screw-threaded into the side plates 32, 33. With the exception of the numeral-wheel of the units order and the numeral-wheel of the highest order, each numeral-wheel unit is made up of a numeral-wheel proper 34, which carries the figures 0, 1, 2, 3. * * * 9, a driving gear 35, a circular cam disk 36 having a single notch at 37 and a carrying cam 38, the parts of each unit being fastened together by rivets as shown in Fig. 3. Mounted in appropriate position in the side plates is also an auxiliary spindle 39, upon which are mounted the transfer pinions 40, 40, these transfer pinions serving to carry from the units order into the tens order, from the tens order into the hundreds, etc., in the usual manner. The numeral-wheel unit of lowest order is provided with a wide-faced driving gear 41 instead of the ordinary driving gears such as are supplied to the numeral-wheel units of higher orders. The numeral-wheel unit of the highest order in each register is not provided with the cam 36 and the carrying cam 38, but is provided instead with a resetting cam 42 provided with a single notch at 43, as best shown in Fig. 2.

It will be seen that the uppermost register as shown in Fig. 2 is a cross-sectional view of the register taken on line 44 of Fig. 3. The second register from the top in Fig. 2 is illustrated in a section taken on line 45 of Fig. 3, whereas the third register from the top, as shown in Fig. 2, is a sectional view taken on line 46 of Fig. 3.

All six of the registers in each bank are alike.

The front plate 47 of a bank of registers is preferably integral with the side plates 32 and 33, the whole framework being formed of a piece of sheet metal bent into U-shaped cross-section. The holes cut at 48, 48, above and below the registers, are intended to receive paper cards or type bearing appropriate inscriptions.

Each bank of registers is adapted to be brought into register with a bank of electromagnetic actuators, as illustrated in Fig. 2, and the locking disk 50 serves to hold the bank of registers in place upon the bank of electromagnetic actuators. There is such a locking disk both at the top and at the bottom of each bank of electromagnetic actuators.

It will be noted that one side of the locking disk 50 is cut away. The purpose of this feature is as follows: When it is desired to remove a bank of registers from a bank of electromagnetic actuators, the locking disk 50 is turned by means of a screw-driver applied to the forward end of its stud until the flattened side of the locking disk is opposite the bank to be removed. Normally the periphery of the locking disk rides upon the projection 51 of the locking plate 52 and holds the locking plate in the position shown in Figs. 2 and 4. When, however, the locking disk is turned to the releasing position the spring 53 will force the locking plate upwardly, thereby bringing one of its six locking projections 54 into a locking position between two of the teeth of the wide-faced driving gear 41 of the units order of each register. When therefore the bank of registers is removed from the electromagnetic actuators, the several register mechanisms will be locked in the positions in which they stand at the time of their removal from the bank of actuators.

The great majority of the electromagnetic actuators of the system of my invention are like those illustrated in Figs. 2 and 5, most of the actuators being provided with a single winding or helix on each core. A considerable number of the electromagnetic actuators of this type are, however, wound differentially with two coils of wire through which the electric currents flow in opposite directions at times to neutralize the magnetic effects of one another.

The system contains also a few electromagnetic actuators which are mechanically differential.

The points of difference involved in such mechanically differential actuators are illustrated in Fig. 7. The electromagnets and armature mechanisms shown in Fig. 7 are identical with those previously described in connection with Figs. 2 and 5. It will be seen that the uppermost electromagnetic mechanism drives a gear 60, while the lowermost electromagnetic mechanism drives a gear 61. The gear 60 is mounted on a quill shaft 62 fastened at the other end to the driving bevel gear 63. The driving gear 61 communicates its motion to the other driving bevel gear 64 of the differential set, this motion being communicated from the driving gear 61 through a quill shaft 65 and the bevel gear 66 to an idler bevel gear 67, which rotates upon a stud 68 mounted in the frame and which idler in turn rotates the bevel gear 69 which is pinned to the shaft 70, the bevel gear 64 being pinned also to this same shaft 70. Loosely mounted upon the shaft 70 is an actuator gear 71, to which is riveted a fork 72, which fork carries upon suitable studs the bevel pinions 73, each of the bevel pinions meshing, as shown, with the two bevel driving gears 63 and 64.

In Fig. 7 I have indicated also a register which is like the registers already described except for the fact that the driving gear 74 of the numeral-wheel of units order is set off from the numeral-wheel proper a distance sufficient to bring its teeth into mesh with the teeth of the actuator gear 71 when the register is adjusted in the position shown in Fig. 7. The result of this construction is that if the upper electromagnet alone is energized, the register will be advanced one space in the units order. If the lower electromagnet alone is energized, the register mechanism will be turned backward one space; while if both electromagnets are energized at the same time, the register mechanism will move neither forwardly nor backwardly.

As in the case of the more common actuator mechanisms shown in Figs. 2 and 5, the electromagnets of the mechanically differential actuator shown in Fig. 7 may be provided with two or more energizing coils wound and connected either differentially or cumulatively, as may be required and as will hereinafter be more fully explained.

Fig. 7 illustrates an actuator mechanism which is mechanically differential. There are some instances in which I find it desirable to provide actuator mechanisms which are mechanically cumulative. The mechanically cumulative actuator mechanisms are identical with the mechanically differential actuator shown in Fig. 7, except that the reversing gears 66, 67 and 69 are omitted and the quill 65 of the driving gear 61 is pinned directly to the shaft 70 in the same manner as is the bevel gear 69 in Fig. 7. Such a modification as has just been referred to is illustrated in Fig. 9 in which figure for the purpose of clearness I have made use of the same reference numerals as have been employed in connection with Fig. 7 adding the letter "a" to each of the reference numerals. The result of this modification is to cause the register to be advanced one space when either the upper electromagnet or the lower electromagnet is energized and to be advanced two spaces when both are energized simultaneously.

In the operation of the system of my invention it is desirable at times to reset the registers of the various banks of registers automatically to their "0" positions. The actuator mechanism for so doing is identical with that illustrated in Figs. 2 and 5, with the exception that there is mounted in the side plates of the actuator mechanism as shown in Fig. 6 an extra spindle 80 which carries an idler gear 81, the teeth of this idler gear meshing with the teeth of the driving gear 18, which is identical with the driving gears illustrated in Fig. 2. The driving gears of the registers may be brought into mesh with the teeth at the front of this idler gear as indicated at 82 in Fig. 6. The idler 81 reverses the direction in which the register mechanism will be actuated when brought into association with the resetting actuator illustrated in Fig. 6.

The electromagnet of the resetting actuator is provided with a pair of spring contacts 83 and 84 connected in series with the winding of the electromagnet. The cam spring 85 rides normally on the periphery of the resetting cam 42 fastened to the numeral-wheel of highest order of the register to be reset, and when this cam spring 85 rides on the periphery of the cam 42, as shown in Fig. 6, it holds the spring 84 in electrical contact with the spring 83. A series of electrical impulses flowing through the winding of the resetting actuator will, therefore, cause the associated register to be reset step by step toward its "0" position. This resetting will continue until all of the numeral-wheels are at their "0" positions. The flow of a single impulse of current in addition to the number necessary to return the numeral-wheels to the "0" positions will cause all of the numeral-wheels to turn from their "0" positions to their "9" positions, this turning including the numeral-wheel of highest order. The notch 43 in the periphery of the resetting cam 42 is in such position that when the numeral-wheel of highest order is turned to display the figure 9, the tip of the spring 85 will drop into the notch, thereby permitting the spring contact between springs 84 and 83 to open. When the circuit of the actuator magnet is opened at this point, no further impulses of current can flow and no further resetting operation of the register mechanism can occur. I have pointed out that the resetting mechanism acts automatically upon the flow of electric impulses to reset the registers not only to their "0" positions but one space beyond. When, therefore, the registers are removed from the resetting actuator mechanism, it is necessary to advance the registers to the amount of one unit by hand. The one-space advancement of the units order wheel will return the numeral-wheels of all the orders from their "9" to their "0" positions.

I shall proceed now to describe the electrical impulse controlling mechanism and the circuits which carry the impulses of current to the electromagnetic actuators:

There is a main driving motor 100, the circuit of which is closed once each minute under the control of a clock 101. The switch mechanism 102 is normally in the position shown in Fig. 1. Once each minute, as previously stated, the clock closes a circuit which may be traced from the positive pole of the battery 103 through the battery main 104 to the wire 105, thence through the pilot magnet 106, the wire 107, the switch blade 108, the contacts of the clock, the wire 109, the program commutator 110, the wire 111, and thence by way of the main 112 back to the negative pole of the battery. Current flowing over this circuit energizes the pilot magnet 106, whose armature serves when actuated to close the electrical contacts at 113. These contacts close the circuit of the motor switch magnet 114 and incidentally close a circuit through the burden relay magnet 115. Leaving the function of the burden relay magnet out of consideration for the moment, it will be seen that the energization of the motor switch magnet 114 closes circuit through the motor 100. The shaft of the motor is provided with a male Geneva gear at 116 and this male Geneva gear, meshing with the female Geneva gear 117, causes the selector commutator shaft 118 to be rotated step by step. The female Geneva gear 117 is provided with ten notches, so that ten revolutions of the male Geneva gear 116 are required to produce a single revolution of the selector shaft 118. A motor stopping cam 119 is mounted upon the selector shaft 118. The raised periphery of this cam maintains the closure of the contacts 113 throughout the complete revolution of the selector shaft, but when the selector shaft has completed a single revolution, the cam surface of the armature of the electromagnet 106 will drop into the notch in the periphery of the stopping cam 119, thereby causing the contacts 113 to be opened. The armature of the electromagnet 106 is at this time free to drop into the notch 119 because the electromagnet 106 will have become deënergized a few seconds after the clock circuit is closed. In other words, the clock closes the circuit for a few seconds at the end of each minute. For example, the circuit may be closed for the last ten seconds of each minute. Upon the closure of the clock circuit the motor begins to rotate and will continue to rotate for nearly a minute—for example, forty or fifty seconds before the notch in the periphery of the cam 119 will come to the position in which the cam surface of the armature of the electromagnet 106 will drop into it to open the circuit of the electromagnetic motor switch 114, thereby bringing the motor to a stop. To all intents and purposes the motor 100 might just as well run continuously and at a speed such that the selector shaft 118 would be given a single revolution in each minute of time. The arrangement which I have provided is merely a simple and inexpensive expedient for bringing about a single revolution of the selector shaft 118 once in each minute of time.

In accordance with my invention, there is assigned to each workman an electromagnetically actuated time register and also an electromagnetically actuated wage register. Provision is made for sending electric current impulses through each workman's electromagnetic time register at a fixed rate during all of the hours in which the particular workman is at work, and for sending current impulses through each workman's wage register mechanism at a rate corresponding with the particular workman's rate of wages. There is assigned to each workman a circuit or circuits in which his electromagnetic register mechanism is connected, and in each such workman's circuit there is connected a manual switch, which is to be closed during the man's hours of work and which is to remain open whenever the workman is not at work. One terminal of each such circuit is connected to a part of the switching mechanism from which current impulses at the proper rate are being sent out.

Before attempting to describe the circuits and the electromagnetic register mechanism therein, I shall describe the rate-controlling mechanism which delivers to appropriate rate bus bars the current impulses, which are thence carried through the circuits previously referred to. All of the impulses for the control of the time and wage registers are controlled in the first instance by the time and wage impulse commutator 120. The lower brush riding upon this commutator is connected, as shown, with the positive pole of the battery 103, whereas the upper brush of the pair is connected by means of the wire 121 with the shaft 122 upon which the rate commutators 123, 124, 125 and the time rate commutator 126 are mounted. The main impulse commutator 120 is mounted upon the shaft of the motor 100, which is geared to the selector shaft and the time-controlling mechanism in a ratio such that the commutator 120 will make 10 complete revolutions per minute. The positive pole of the battery 103 is, therefore, connected 10 times per minute with the shaft 122 upon which the rate commutators are mounted. The time rate commutator 126 is provided with 10 metal or live segments equally disposed around the periphery of the commutator, each of the 10 segments being permanently connected with the rate commutator shaft 122. The brush 127 rides on the periphery of the time rate commutator 126 and is connected by a wire with the time rate bus bar 128. Upon the rate commutator shaft 122 is rigidly mounted the sixty-notch female Geneva gear 129, which meshes with the one-tooth male Geneva gear 130 rigidly mounted upon the selector shaft 118. The rate commutator shaft is therefore given one-sixtieth of a complete revolution at the end of each minute, the rate commutator shaft and the rate commutators remaining stationary at all times except during the short intervals during which they are turned by the meshing of the teeth of the Geneva gear set 129 and 130. The time rate commutator 126 is in the drawings shown to be in a position such that the brush 127 rests upon one of the dead segments of the commutator. However, during the minute during which connection is maintained, the time rate bus bar 128 will be connected for ten short intervals of time with the positive pole of the battery 103, due to the rotation of the main impulse commutator 120. At the end of a minute's time, the rate impulse shaft and its commutators will be advanced one-sixtieth of a revolution, thereby breaking the connection between the brush 127 and a live segment of the commutator. During the five minutes next succeeding, the brush 127 rests upon an insulated or disconnected arc of the commutator and the time rate bus-bar 128 will not during these five minutes be connected with the positive pole of the battery. During the seventh minute the time rate bus-bar will be connected again with the main impulse commutator 120 to provide for ten intermittent connections with the positive pole of the battery.

Without stopping at this point to describe the wage rate commutators, etc., I shall trace the flow of the current impulses thus delivered to the time rate bus-bar 128.

At 131 I have shown an in-and-out switchboard panel, upon which ten manually operable switches are mounted, one above another. The six lowermost switches are connected in workmen's time and wage circuits, it being the rule for each workman to close his switch when he begins work in the morning, to open his switch when he goes out at noon, to close is switch when he begins work in the afternoon, and to open his switch when he leaves off work at night. The six workmen's switches on the board 131 are double-pole switches, each switch thus serving to close or open two circuits, one which may be designated as the time circuit and the other which may be designated as the wage circuit. Assuming that the lowermost switch upon the panel 131 is assigned to workman A, we may trace the time circuit of this workman, providing we assume also that his manual switch on the board 131 is closed, as will be the case during his hours of labor. During the last minute of every six minutes, the rate bus-bar 128 being supplied with electrical potential by connection with the battery 103, an impulse of current will flow through the wire 132, thence through the lower connector of the double-pole switch to the wire 133, thence through the single energizing coil of the electromagnetic time register $Ta$, thence through wire 134 to time segment 141 of the time selector 140, thence through the rotating brush 150 associated with the time selector, thence through the insulated section 151 of the selector shaft, thence through wire 152 to the single energizing coil of the time totalizing register $Tt$, thence through wires 153 and 154 to the brush 155 of connector commutator 156, thence through the metal segment of this commutator to brush 157, and thence through wire 158 to the negative pole of battery 103. The angular disposition of the metal segment of commutator 156 is such as to close the circuit between the brushes 155 and 157 whenever the metal segment of the main impulse commutator 120 closes circuit between the two brushes associated with the impulse commutator.

The impulse of current flowing over the circuit just traced will advance the workman's time register $Ta$ one step, and this workman's time register will thus be made to show a credit of one-tenth of an hour's time to workman A, to whom this particular time register has been assigned. This workman's register is an electromagnetically actuated register like any one of those illustrated in Figs. 2, 3 and 5. This impulse of current causing the one-step advancement of the individual time register T$a$ will also cause the one-step actuation of the total time register T$t$.

It will be remembered that the selector shaft 151 is advanced step by step to make a complete revolution in one minute, a single revolution being made up of ten equi-angular steps of advancement; and it will be remembered also that the main impulse commutator closes its circuit once during each of the ten stops of the commutator shaft and its associated mechanism. As a result one impulse only of current can flow over the workman's time circuit just traced, after which the time circuit of workman A will be broken by the advancement of the brush 150 into a position one-tenth of a revolution in advance of that shown in the drawing—namely, into a position in which the connection between the brush 150 and the commutator segment 141 will be broken and into a position in which a connection will be established between the brush 150 and segment 142 of the time selector.

The second of the ten current impulses thus delivered to the time bus-bar 128 will not flow through the time register T$a$ assigned to workman A, but will flow through the time circuit of workman B, which circuit includes segment 142 of the time selector 140. This statement as to the flow of the second of the ten impulses through the time circuit of workman B is, of course, true only in case the in-and-out switch of workman B (the second from the bottom on panel 131) is closed. Assuming that workman B is at work, a circuit similar to that previously traced in connection with workman A may now be traced in connection with workman B and that apparatus assigned to him. This second current impulse will flow through the time register T$b$ assigned to workman B and also through the total time register T$t$.

We may assume that workman C is not at work. His in-and-out switch (the third from the bottom of panel 131) will not be closed. The third of the ten intermittent connections of the time rate bus-bar 128 with the positive pole of the battery 103 will not, therefore, result in the flow of a current over the time circuit assigned to workman C. The time register T$c$ assigned to workman C will not, therefore, be actuated; nor will the total time register T$t$ be actuated.

If workman D is at work, his in-and-out switch (the fourth from the bottom of panel 131) will be closed, and the fourth of the ten impulses of current will flow through the circuit assigned to workman D, thereby causing a one-step advancement of the time register T$d$ assigned to workman D and causing an actuation also of the total time register T$t$.

Without thus following in detail the actuation of all of the several workmen's register mechanisms, it will now be apparent that the workmen's time registers T$a$, T$b$, * * * T$f$, will be actuated to show always the total of time with which each workman is to be credited, and the time total register T$t$ will exhibit at all times the total of all of the time of all of the workmen.

Each workman is supplied also with a wage register which totals the wages earned by the workman. These workmen's wage registers are adapted to be connected in circuits somewhat similar to the workmen's time circuits, but the wage circuits are supplied with current impulses at rates corresponding with the rates of wages paid the several workmen. There is also a wage total register corresponding with the time total register.

Since the different workmen may earn wages at different rates, I provide wage-rate bus-bars with which the battery or source of current is connected periodically, the battery being connected with the different wage-rate bus-bars at different intervals such that one bus-bar will supply current impulses corresponding with one rate of wages, another bus-bar will supply impulses corresponding with another rate of wages, etc. Each workman's wage circuit is more or less permanently connected with the wage-rate bus-bar delivering impulses corresponding with such workman's wage rate.

The current impulses are supplied to the wage-rate bus-bars through commutators closing the battery connections at appropriate intervals of time.

In Fig. 1, I have shown four wage-rate bus-bars $W_{10}$, $W_{20}$, $W_{40}$, and $W_{60}$. The wage bus-bar $W_{60}$ is connected by means of the wire 121 with a brush associated with the main impulse commutator 120, as a result of which the positive pole of the battery will be connected with the wage-rate bus-bar $W_{60}$ ten times during each minute in an hour; in other words, the wage-rate bus-bar $W_{60}$ will be connected during every one of the sixty minutes of the hour with the positive pole of the battery 103.

The wage-rate bus-bar $W_{40}$ is, however, connected with the battery by means of a wage-rate commutator 123. This commutator may be regarded as divided into sixty equal segments corresponding with the sixty minutes in an hour. Every third segment being dead or of insulating material, this will leave forty live segments with the result that, during forty of the sixty minutes of the hour, the wage bus-bar $W_{40}$ will be connected through the main impulse commutator 120 with the positive pole of the battery 103, it being remembered in this connection that the rate commutators are mounted upon a shaft 122 which makes one complete revolution per hour, the rotation being divided by the Geneva gearing 129 and 130 into sixty angularly equal steps.

The wage bus-bar $W_{20}$ is connected with the main impulse commutator 120 and the battery 103 through the live segments of a rate commutator 124 in which there are sixty segments, every third segment being live and in which the two intervening segments in each instance are dead or insulated.

The wage bus-bar $W_{10}$ is connected with the impulse commutator 120 through a rate commutator 125 in which every sixth segment of the sixty segments of the commutator is live and in which the intervening five segments in each instance are disconnected or insulated.

The result is that the wage commutator $W_{10}$ is connected with the source of current impulses during one minute out of every six, or, in other words, during ten minutes out of the hour, the wage bus-bar $W_{20}$ is connected during every third minute; the wage bus-bar $W_{40}$ is connected during two minutes out of every three and the wage bus-bar $W_{60}$ is connected during each of the sixty minutes in an hour.

The wage register $W_a$ is assigned to workman A. The lowermost in-and-out switch on the in-and-out panel 131 is also assigned to workman A. It will be noted that the upper switch blade of A's in-and-out switch is connected with wage bus-bar $W_{20}$. Let us assume that workman A is at work and that his in-and-out switch is closed. During every third minute, the rate commutator 124 establishes a connection between the wage bus-bar $W_{20}$, as a result of which a flow of current can be traced from positive pole of the battery 103, through the main impulse commutator 120, the wire 121, the shaft 122 and a live segment of rate commutator 124, to the wage bus-bar $W_{20}$, thence, through the upper switch blade of A's in-and-out switch, thence, through wire 171, to segment 181, of the general selector 180. It will be noted that the brush associated with the general selector 180 is shown in electrical contact with segment 181. The electrical connection may, therefore, be traced through wire 190 and wire 191 to the brush associated with the wage selector 200. This brush is shown in electrical connection with segment 201, of this wage selector, whence connection may be traced through wire 210 to the single energizing coil of the electromagnetic register mechanism $W_a$, thence through bus-wire 211 and the single energizing coil of the wage total register $Wt$ to wire 212, thence through one of the two differential windings on one of the electromagnets of the electrically and mechanically differential undistributed burden register UB, thence, through wire 213 and one of the two differential windings on one of the two electromagnets of the mechanically and electrically differential total cost register TC, thence, through wire 214 through one of two differential electromagnet windings 215 associated with the burden reservoir mechanism, subsequently to be described, thence, through a single electromagnet winding of the departmental wage total register $WT_1$, thence through wire 216 to one of the two differential windings of the electromagnetically actuated departmental waste wage register $Ww_1$ thence through wire 217 and wire 218 to segment 221 of the departmental selector 220, thence through the brush of this departmental selector and the wire 219 and wire 154 to brush 155, thence through the metal segment of connector commutator 156 and brush 157, through wire 158, back to the negative pole of the battery 103.

We have traced a circuit through which a single impulse of current flows. The selector shaft 118 with the brushes mounted thereon is given thirty-six degrees of rotation at the end of every six seconds of time, that is, the selector shaft is given one step of angular advancement at the end of each revolution of the motor shaft 100 upon which the main impulse commutator 120 and the connector commutator 156 are mounted. As a result of this arrangement, the main impulse commutator will cause one impulse of current to flow over the circuit just traced, but before the impulse commutator 120 has commenced its second revolution, the selector brushes will have been advanced to new positions on the selectors, as a result of which the circuit just traced through the workman's wage register $Wa$ is opened at the wage selector segment 201 at the time the main impulse commutator 120 closes its circuit to cause a second current impulse to flow. When, therefore, the main impulse commutator 120 closes its circuit for the second time in any one minute, no current impulse will flow through the workman's wage register $Wa$.

It will be remembered that workman A is to receive twenty cents per hour; in other words, he earns one cent every three minutes. His wage register should not, therefore, be actuated again until the beginning of the third minute following that last considered and, although the brushes on the selector shaft 118 make a complete revolution once in each minute and would, therefore, at the beginning of the second and third minutes close circuit through segment 201 of the wage selector 200, no current will flow at these times because, the brush of the rate commutator 124 will be resting upon insulated or dead segments of this rate commutator.

The other workmen's wage registers are connected in circuits similar to that just traced, including a segment of the wage selector 200, so that each workman's wage circuit is closed at the selector during one of the ten intervals in each minute, and, if at that time the circuit is closed also through the rate commutator, a current impulse will flow. If, however, the circuit is not at that time closed through the connected rate commutator, then no impulse will flow.

Wage register $W_c$ is assigned to workman C. It will be seen that his circuit is to traced through segment No. 203 of the wage selector 200 and through segment 183 of the general selector 180 through the upper switch blade of the third in-and-out switch from the bottom of the panel 131 and thence to the wage bus-bar $W_{60}$. This bus-bar $W_{60}$ being connected with the impulse commutator during all of the sixty minutes of an hour, the register $W_c$ will be supplied with one impulse of current during each minute of time. The first impulse of current in any one minute as delivered by the main impulse commutator 120 will flow through the wage register $W_a$ assigned to workman A. The second impulse in any one minute may or may not flow depending upon whether a completed circuit is closed when the brushes of the selectors 180 and 200 close completed circuits while resting upon segments 182 and 202, respectively. The third impulse of current delivered in any one minute will flow through electromagnetic mechanism of wage register $W_c$, as just explained, and the sixty impulses of current which flow through this wage register $W_c$ in each hour will flow also through the total wage register $Wt$, thereby causing a corresponding advancement of the numeral wheel mechanism of this totalizing register. If impulses of current were to flow through two of the wage registers at the same instant of time, they would flow simultaneously through the wage total register $Wt$, thereby causing a single one-step advancement of the totalizing register, whereas, if the totalizing register is to exhibit the total of wages, it must be advanced one step whenever an impulse of current flows through any of the individual wage registers. The selector mechanism which closes the circuits of the individual wage registers one after another creates a condition such that the wage totalizing register may exhibit a total corresponding with all of the current impulses flowing through all of the individual wage registers.

The sixty current impulses which flow during each hour of work through the electromagnet of the individual wage register $W_c$, after passing through the wage totalizing register $Wt$, may be traced through wire 212 and thence through the same register and burden mechanism as in the case of the twenty current impulses which in each hour flow through the individual wage register $W_a$.

Workman E is supplied with a wage circuit including the electromagnet coil of the individual wage register $W_e$. His in-and-out switch is the fifth from the bottom of panel 131. The upper or wage switch blade of his in-and-out switch is connected with wage bus-bar $W_{20'}$. It will be noted that this bus-bar is connected through an overtime switch below the bus-bars with an electrical contact connected with wage bus-bar $W_{20}$. When the overtime switch is in its normal position, as shown, the bus-bar $W_{20'}$ will be connected during every third minute with the main impulse commutator 120. Normally, therefore, the individual wage register $W_e$ will receive twenty impulses of current in each hour. These impulses, like the others, may be traced through the wage totalizing register $Wt$ and the balance of the general wage circuit previously traced. Workman F is provided with a wage circuit leading through the sixth in-and-out switch from the bottom of panel 131 and through the individual wage register $W_f$. The upper or wage switch blade of this in-and-out switch assigned to workman F is connected with wage bus-bar $W_{40'}$, which normally is connected through its overtime switch just below the bus-bar $W_{40'}$ with bus-bar $W_{40}$. This bus-bar connection of the wage circuit of workman F is such that the circuit will be closed through the main impulse commutator 120 during two minutes out of every three. Forty current impulses will, therefore, flow through the wage circuit of workman F during each hour, this corresponding, of course, with a rate of wages of forty cents per hour.

I may well describe at this point the operation and purposes of the overtime switches already alluded to. The clock 101 is provided with a program commutator 230 which rotates once in twenty-four hours. During the normal working hours, say from eight a. m. until five p. m., the metal segment of this commutator makes connection with the brush 231, which, in turn, is connected with wire 232 leading to the electromagnet 233, the other terminal of which is connected with the positive pole of the battery as a result of which the program commutator maintains the energization of the electromagnet 233 between the hours of eight a. m. and five p. m., thus holding the overtime switches in the positions shown in the drawings. At five o'clock p. m., the metal segment of the program commutator 230 breaks connections with the brush 231 and makes connection with the brush 234, which brush with the auxiliary brush 234' insures the closure of a circuit through the electromagnet 235 during the time from 5:00 o'clock p. m. until 8:00 o'clock a. m. Upon the energization of the electromagnet 235, beginning at 5:00 o'clock p. m., the overtime switches are thrown in to their alternate positions, in which each of the overtime switches makes connection with the switch contact just to the left of the positions occupied by the overtime switches, as shown in the drawing. If, therefore, it is the rule of the establishment that workman E is to receive twenty cents per hour during the regular hours of work, from 8:00 a. m. until 5:00 p. m. and a rate of forty cents per hour for all time which he may be required to work outside of these regular hours, the wage switch blade of his in-and-out switch will be connected as shown with the rate bus-bar $W_{20'}$. From 8:00 a. m. until 5:00 p. m., the rate bus-bar $W_{20'}$ is connected through the overtime switch with the rate bus-bar $W_{20}$, as a result of which twenty impulses of current per hour will flow over the wage circuit of workman E between the hours of 8:00 a. m. and 5:00 p. m. After 5:00 p. m., however, the overtime switch moves into the alternate position in which the rate bus-bar $W_{20'}$ is connected through the overtime switch with the rate bus-bar $W_{40}$. As a result of this alternate connection, rate bus-bar $W_{20'}$ will be connected during two minutes out of every three minutes with the impulse commutator 120, with the result that forty impulses per hour instead of twenty impulses per hour will flow over the wage circuit assigned to workman E. The overtime switches operate in similar manner to supply ten impulses per hour during the time from 8:00 a. m. to 5:00 p. m. to the wage circuits connected at one end with the rate bus-bar $W_{10'}$, and to supply these same circuits with impulses at the rate of twenty per hour during all hours outside these normal working hours. The wage circuit of workman F is connected with the rate bus-bar $W_{40'}$, as a result of which his wage register will receive forty impulses per hour during the normal hours from 8:00 a. m. to 5:00 p. m., and sixty impulses per hour during all hours outside of these normal working hours. It will be noted that the workmen whose circuits are connected with the rate bus-bars $W_{10'}$ and $W_{20'}$ receive double credit for "overtime", i. e., for the time they work outside of the normal working hours. The workmen whose circuits are connected with rate bus-bar $W_{40'}$, on the other hand, are credited with time and a half for "overtime". By appropriate interconnection of the wage bus-bars through appropriate overtime switches, it is possible to credit each workman with double time or time and a half or time and a quarter, etc., as may be the rule of the establishment, or the agreement with the workman, or workmen. When a workman's wage circuit is connected with a bus-bar such as $W_{20'}$, his wage register will receive current impulses at the rate of twenty per hour regardless when the hour of work may fall; that is to say, such a workman, as for example workman A, will be credited with wages at the rate of twenty cents per hour during the hours from 8:00 a. m. to 5:00 p. m. and will be credited also with wages at the rate of twenty cents per hour during any hours in which he may work between 5:00 p. m. and 8:00 a. m.

It is frequently desirable in an industrial establishment to pay some workmen at fractional rates per hour, as for example 10½¢ per hour. In accordance with my invention, I arrange to credit a workman with 10½¢ per hour by crediting him with 10¢ in one hour and with 11¢ during the next succeeding hour, during the third hour he is credited with 10¢ and during the fourth hour with 11¢, etc., this arrangement serving to credit him with an average rate of 10½¢ per hour. Thus, workman D is to receive wages at the rate of 10½¢ per hour. Accordingly, his wage circuit is connected at one end with wage bus-bar $W_{10}$, but after the circuit has been led through the electromagnet of the workman's wage register $Wd$, connection is made with the fractional-cent bus-bar 236 instead of through a bus-wire 211. This fractional-cent bus-wire 236 leads to a fractional-cent electromagnet 237, the circuit then being carried by means of wire 238 to the electromagnet winding of the wage total register $Wt$ and thence, as previously described, back to the negative pole of the battery 103. Each impulse of current flowing through the wage register $Wd$ thus causes an energization of the electromagnet 237. The energization of this magnet does not ordinarily, however, produce any effect upon the bell crank armature 239 for the reason that the horizontal arm of this bell crank lever is provided with a projection 240, which rides upon the periphery of a cam 241 driven by geared connection from the rate commutator shaft 122, the ratio of gearing in this instance being such that the cam 241 makes one complete revolution in two hours. The notch 242 in the periphery of the cam 241 is of a width such that during one minute at the end of every second hour, it will permit the projection 240 to drop into the notch 242. When, therefore, during the last minute of the second hour, a full-cent current impulse flows through the wage register $Wd$, the energization of the electromagnet 237 will cause a movement of the bell crank armature 239, as permitted by the notch 242. As soon as the armature 239 is moved into its attracted position, the latch 243 will engage the upper end of the armature lever 239 to hold it in its attracted position. The attraction of this armature lever 239 serves primarily to close the fractional-cent contacts 244. It will be apparent that the fractional-cent contacts 244 are closed at the time a current impulse is caused to flow due to a connection between brushes as established by the metal segment of the main impulse commutator 120.

Mounted upon the shaft 100, as is the main impulse commutator 120, is an auxiliary impulse commutator 245. The metal segment of this auxiliary impulse commutator is angularly displaced with respect to the metal segment of the main impulse commutator 120, so that it is not until after the cessation of the flow of the impulse controlled by the main impulse commutator 120 that the auxiliary impulse commutator 245 closes the circuit between its brushes 245a. As soon, however, as the auxiliary impulse commutator does close this circuit, an auxiliary current impulse can be traced from the positive pole of the battery 103, through the brushes 245a and metal segment of the auxiliary impulse commutator 245, thence through the fractional-cent contacts 244, the wire 121, the shaft 122 of the rate commutator mechanism, thence through a live segment of rate commutator 125, rate bus-bar $W_{10}$, the wage switch blade of the in-and-out switch assigned to workman D (fourth from the bottom of the panel 131), thence to segment 184 of the general selector 180, thence through the brush of this general selector, wire 190, wire 191, to the brush of the wage-rate selector 200, thence to segment 204 of the wage-rate selector 200, thence to an electromagnet coil of the individual wage register $Wd$, thence through wire 236, electromagnet 237, wire 238, to the winding of the wage-total register $Wt$, thence through wire 212, one of the differential windings of the undistributed burden register UB, wire 213, one of the cumulative windings of the total-cost register TC, wire 214, winding 215 of the burden reservoir mechanism previously referred to, thence through the single electromagnet winding of the departmental wage-register $WT_2$, thence through one of the electrically differential windings of the departmental waste wage register $Ww_2$, thence through wire 246 to commutator segment 224 of the selector 220, thence through the brush of this selector 220, wire 219, wire 154, wire 247, to connector commutator 248, which for one minute at the end of each hour closes circuit through its brush, whereby the impulse of current under consideration may be traced through the wire 158 and wire 112 to the negative pole of the battery 103. It will be seen that the arrangement just described causes the flow of one additional current impulse at the end of the second hour through the individual wage register $Wd$ and the wage-total register $Wt$, also through the more generic registers over which the circuit has been traced but the purposes of which have not as yet been explained.

A tripping cam 249 mounted upon the shaft 100 is placed at such an angular position that immediately after the metal segment of the auxiliary impulse commutator 245 has passed the brushes 245a of that commutator, the cam 249 will raise the latch 243 to trip the armature 239, which will, therefore, be restored to its normal position by means of the associated spring. When the armature is restored to its normal position, the fractional-cent contacts 244 are opened. These may be caused to close by the flow of full-cent impulses through the individual wage registers assigned to other workmen who may be paid at fractional-cent rates and whose circuits include, therefore, the fractional-cent bus-bar 236. At the end of this last minute of this second hour, however, the armature 239 will have been locked in its normal position, in which it will be retained by the cam 241 so that no other fractional cent impulse will flow until the last minute of the second succeeding hour.

It will be readily understood that, if any workman had a rate of wages which involved the payment of a fourth of a cent per hour, similar mechanism is arranged to cause the flow of an additional impulse at the end of every fourth hour instead of at the end of every second hour, etc.

The operation of the mechanism thus far described will give to the shop manager a currently available record of the amount of time spent by each workman. It will give him also a currently available record of the wages earned by each workman. By means of mechanism subsequently to be described in detail, the various registers can be set back to zero positions whenever desired, as, for example, at the end of each week, with the result, therefore, that the individual wage registers will show, at the end of each day or each hour, the wages earned and due each such workman at the time when the wage register is inspected. The showings of these wage-registers at the end of any pay-roll period, as, for example, at the end of any week, will exhibit the amount of wages to be paid to each workman. The wage-total register $Wt$ will exhibit the total of the wages earned and due the several workmen. In like manner, the total time register $Tt$ will exhibit the total number of hours of time of work of all of the workmen.

In tracing certain of the circuits, I have referred to a number of generic registers, such, for example, as UB, $Wt_1$, $Ww_1$, etc. The purpose of these registers can be better explained after describing certain other features of my invention.

In accordance with my invention, I not only acquire automatically an indication of the time of each workman and the wages earned by him, with appropriate totals thereof, but I secure automatically an indication of the cost of production of each job undertaken in the plant. Furthermore, I secure an automatic analysis of the cost of each job, as, for example, the cost of labor in each department of the plant, the cost attributable to the expense of providing and running machinery, the cost of material and the item of cost due to an appropriate distribution of overhead expenses or burden, such, for example, as light, heat, superintendence, insurance, etc. To each job is assigned a bank of registers in which the individual registers exhibit the several items of cost, in accordance with the predetermined plan of analysis and in which a job total register exhibits the total job cost. In accordance with my invention, I provide registers also for exhibiting various totals and differences in conformity with a predetermined scheme of cost accounting.

I shall first describe the mechanism and the mode of operation by which the labor costs of the several jobs are ascertained.

At 260 and 261, I have indicated two banks of job cost registers, each bank being like that illustrated in Figs. 2, 3, 4 and 5 of the drawings. The uppermost register in each bank indicates at all times the value of the material used upon the job to which the bank is assigned. The second register from the top indicates the proportion of burden or overhead expense chargeable to the job. The next register indicates the amount of wages paid to workmen in department No. 1 upon the particular job to which the bank is assigned. The next register indicates the amount of wages paid in department No. 2 upon the same job. The next register indicates the item of cost due to the use of a machine or machines upon the job, and the lowermost register indicates the total of the items appearing in the five registers assigned to the various details of the cost. Referring, for example, to the job cost bank 260, the electromagnets of the material register J′M, the burden register J′B, the departmental wage register $J'W_1$, the departmental wage register $J'W_2$, and the machine cost register $J'W_m$ are all connected together in multiple and in series with the electromagnet coil of the job total register J′T, the wires leading to the other side of the specific or detailed job cost registers being connected to telephone spring jacks 262. The registers of the job bank 261 are similarly connected with spring jacks 263. There may be any number of such banks of registers similarly connected with sets of spring jacks, the number of banks depending upon the number of jobs which are likely to be going through the establishment at any one time. When a job comes into the establishment a bank of registers is assigned to it, and the bank of registers thus assigned is continued in service for the purpose of accounting the cost of that job until that job is completed.

To each of the several workmen is assigned a switching plug such as is used in telephone switchboards, the several plugs being adapted for insertion into any of the job spring jacks to establish electrical connection between the plug and the switch jack into which it is inserted. Thus, in Fig. 1 of the drawings, I have illustrated nine connecting plugs, six of which are assigned to workmen A, B, C, D, E, and F, the plug assigned to workman A being represented at $P_a$, the plug assigned to workman D being designated as $Pd$, etc. If we assume that workman A reports at eight o'clock in the morning and is assigned to job 260, his plug $P_a$ will be inserted by the foreman or operator into one of the spring jacks $262_1$. If workman D, who works in department No. 2, goes to work on job 261, the operator will insert plug $P_d$ into one of the spring jacks $263_2$. The plugs of any number of workmen may be inserted in the proper spring jacks of any bank of job spring jacks. Assuming that plug $P_a$ is inserted in spring jack $262_1$, current impulses will flow through the departmental wage register $J'W_1$ and the job total register J′T; the number of current impulses flowing through these job registers due to this plugging connection being identical with the number of current impulses flowing through the wage register $W_a$ assigned to workman A. The number of impulses flowing over such a circuit depends upon the identity of the wage-rate bus with which the terminal of the wage circuit of workman A is connected.

We have heretofore explained and traced the flow of current impulses through the wage circuit of workman A from the positive pole of the battery to the brush of the general selector 180. In tracing the flow of these current impulses through the workmen's individual wage-register $W_a$, we followed the flow of these impulses from the bus-wire 191, to the brush of wage selector 200. If, however, plug $P_a$ is inserted in a spring jack 262, there is closed a branched circuit through which part of the current delivered through wire 190 will flow, the current dividing at the point at which wire 190 joins wire 191 and, substantially one-half of each current impulse will flow through wire 264, the brushes 245b of the auxiliary impulse commutator 245, and the conductor 265 to the brush of the plug selector 270. When the brush of selector 200 is in engagement with segment 201 of the wage selector, the brush of the wage plug selector 270 will be in engagement with segment 271 of the wage plug selector, wherefore, any current impulse which effects the actuation of the wage register $W_a$ assigned to workman A will flow in part also through plug $P_a$, spring jack $262_1$, the electromagnet coil of departmental wage register $J'W_1$, the electromagnet winding of job total register $J'T$, of job bank 260, thence through bus-wire 280, one of the two electromagnets of the mechanically differential register $J^pW_1$, the single electromagnet winding of register $JW_1$, thence through one of the electrically differential windings of register $Ww_1$, and thence through wire 281 to segment 291 of the departmental selector to wire 300, thence through one of the electromagnets of the mechanically differential register $J^pT$, thence through the single electromagnet winding of the register $JT$, thence through one of the electromagnet windings of the mechanically and electrically differential register UB, thence through wire 301 to the second of the differential electromagnet windings 302 of the burden reservoir mechanism, and thence through the wire 303 to wire 154, and thence back to the negative pole of the battery 103. It will be remembered that the impulses of current heretofore traced through the workman's wage register $W_a$ were returned to the negative pole of the battery over wire 154. The circuit just traced is, therefore, a branch circuit which leads out from the main circuit, through wire 264, and which is led back to the main circuit through wire 303, the current impulses flowing undivided through the main circuit, but dividing and passing in part through each of the two branch circuits, in which branch circuits in each case are the electromagnets of the registers to be actuated. As a result of this circuit arrangement, the departmental labor cost register $J'W_1$ and the total job cost register $J'T$ are advanced one step corresponding with a cost of one-cent whenever the workman is credited with one cent in wages. If the plug assigned to workman B were connected also with one of the spring jacks $262_1$, current impulses corresponding with his wages as earned would flow also over the job cost branch circuit last described. So also, if the plug assigned to workman C were connected with one of the spring jacks $262_1$, the departmental labor cost register $J'W_1$ would be actuated to indicate at all times the total of the wages earned by workmen A, B and C, while employed upon job 260.

When workman A finishes his work upon job 260, he notifies the foreman or operator, who withdraws the plug $P_a$ from the set of spring jacks $262_1$. If this workman were immediately assigned to work on job 261, his plug $P_a$ would be immediately inserted into one of the spring jacks $263_1$, whereupon the branch circuit through which current impulses corresponding in number with A's rate of wages would flow through a branch circuit traced through one of the spring jacks $263_1$, the electromagnet coil of labor cost register $J^2W_1$, job total register $J^2T$, thence to wire 280 and, otherwise, as before, back to bus-wire 154. When, therefore, the plug assigned to workman A is withdrawn from one of the spring jacks $262_1$ and inserted in one of the spring jacks $263_1$, appropriate registers of job bank 261, rather than the registers of job bank 260, will be actuated amounts corresponding with the wages earned by workman A.

Workman D is employed in department No. 2 instead of department No. 1, in which A, B and C are employed. If, therefore, the plug $P_d$ be inserted in one of the spring jacks $262_2$, the current impulses flowing through the job cost branch circuit will not flow through the departmental labor cost register $J'W_1$, but will, on the other hand, flow through the departmental labor cost register $J'W_2$. The current impulses will be delivered to segment 184 of the general selector 180, thence through wire 190, wire 264, to brushes 245b, conductor 265, to brush 271 of the plug selector 270, thence through segment 274 of selector 270, the plug $P_d$, thence through spring jacks $262_2$, electromagnet of register $J'W_2$, electromagnet of register $J'T$, bus-wire 310, one of the two windings of the mechanically differential register $J^pW_2$, the electromagnet winding of register $JW_2$, one of the two windings of electrically differentially actuated register $Ww_2$, and thence through wire 311, to segment 294 of departmental selector 290, thence through the brush of this selector to wire 300, one of the electromagnets of the mechanically differential register $J^pT$, the electromagnet of register $JT$, one of the electromagnets of the mechanically and electrically differentially actuated register UB, thence through wire 301, electromagnet winding 302, and wire 303 back to bus-wire 154, and thence, as previously explained, back to the negative pole of the battery 103.

It will be seen that the departmental selector 290 shifts from position to position to determine through which of the bus-wires 280 or 310 of the branch circuit shall be closed, and, in this way, the actuation of the appropriate departmental job totalizing registers are determined. Fig. 1 is drawn on the assumption that workmen A, B and C work in department No. 1, while workmen D, E and F work in department No. 2. The connections with the selectors can obviously be changed to correspond with the anism for three machines, G, H and K. To each of the machines whose "machine wages" are thus accounted for is assigned a wage circuit and a machine wage register similar to those assigned to the individual workmen. Thus, the registers $MW_g$, $MW_h$ and $MW_k$ take account of the wages of machines G, H and K. These machine-wage registers are connected through circuits terminating upon the appropriate wage bus-bars in a manner corresponding with that in which the workmen's individual registers are connected. The in-and-out switches of the machines located on panel 131 are single blade switches rather than two-blade switches as in the case of the workmen, the reason being that in the case of machines there is no particular reason for taking account of the time, such as the workmen's hours of work. The machine-wage circuits will be connected with rate bus-bars such that the number of impulses flowing through the individual machine-wage registers will correspond with the cost of maintaining and operating the machines. The drawing illustrates circuit connections for the machine-wage register $MW_k$ upon the assumption that the cost of maintaining and operating the machine K is greater than the rate of wages represented by the rate bus-bar distributing the highest number of impulses per hour. In order, therefore, to cause a sufficiently large number of current impulses to flow through the machine-wage circuit assigned to machine K, the machine-wage circuit is branched at 330 and thus connected through two of the in-and-out switches at the top of panel 131 to two rate bus-bars, namely $W_{10}$ and $W_{60}$. As a result of this connection seventy impulses of current per hour will flow through this particular machine wage circuit.

Ordinarily, the in-and-out switches in the machine-wage circuits will be maintained in their closed positions, although the in-and-out switches may be opened and closed if desired. This might become desirable in case the machine cost was almost wholly for that of power supplied to the machine. In such case, the in-and-out switch in the particular machine circuit would be open except when the machine was in operation and thus consuming power, at which times the in-and-out switch would be closed.

The machine wage circuit assigned to machine K may be used to distinguish between the cost of maintaining a machine when idle and the cost of maintaining and operating a machine when in use and when power is being consumed. Thus, if the second in-and-out switch from the top of the panel 131 were open, while the in-and-out switch at the top of the panel was closed, the wages of the machine would be charged at the rate of ten cents per hour. This might be an appropriate charge when the machine was standing idle. If now the machine be put in operation so that it consumes power, the second in-and-out switch from the top of the panel would be closed to represent an additional charge of sixty cents per hour due to the large amount of power consumed by this machine when in operation. I call attention to these matters merely to illustrate by practical examples the flexibility and adaptability of the system. The in-and-out switches assigned to the several machines may, if desired, be automatically controlled by the several machines, so that the in-and-out switch of any particular machine will be automatically closed by the machine itself when in operation and automatically opened when the machine comes to rest. Thus, the second in-and-out switch from the top of the panel 131 may be placed under the automatic control of machine K, as a result of which the wages of this machine will be charged at the rate of ten cents per hour when idle and at the rate of seventy cents per hour when running. The change in the rate of charge is automatically controlled by the machine itself or some appropriate moving part thereof.

The machine-wage circuits all lead from the actuating coils of the individual machine-wage registers to a machine-wage bus-wire 331, which bus-wire joins the wire 212 at a point beyond that at which the electromagnet of the wage-total register $Wt$ is connected. This connection of the machine-wage circuits prevents the "machine wages" from being totaled with the workmen's wages in the register $Wt$. At $MWt$ I have shown a machine-wage totalizing register connected in the circuit of the bus-wire 331 to indicate the total of the "machine wages" in a manner corresponding to that in which the register $Wt$ totalizes the wages earned by the several workmen.

The current impulses flowing through the machine-wage registers are returned to the negative pole of the battery 103 over wire 212 and the circuits through which it leads in a manner identical with that which has previously been described in connection with the workmen's wage circuits, with the exception, however, that the departmental wage selector 220 operates to return the machine-wage impulses to the negative pole of the battery through the machine wage register MW and one of the electrically-differential windings of the machine waste wage register $Mw$, rather than through the coils of the workmen's departmental registers $WT_1$ and $Ww_1$ or $WT_2$ and $Ww_2$, as previously described in connection with the workmen's wage circuits.

We have seen that the machine-wage circuits and mechanism are closely analogous to the wage circuits and mechanism assigned to the several workmen. There is a correemployment of any number of workmen in either department and, in practice, there may, of course, be more than the two departments illustrated.

Occasions may arise in which a workman hired in department No. 1 and normally employed in department No. 1 may do some work in department No. 2. If, when thus engaged in department No. 2, workman A should have his plug inserted into a spring jack of one of his ordinary departmental job banks, as for example, $261_1$, or $263_1$, the labor cost of A's wages would appear in the departmental labor cost register $J'W_1$, or $J^2W_1$, as the case may be. This would be confusing and would not give such an analysis of the labor costs as might be required. There may also be other instances in which a more detailed or more fully analyzed accounting of labor cost is desired than could be secured with the ordinary job banks such as 260 and 261.

To take care of such a more detailed analysis, I have illustrated at 320 and 320' a double bank of job registers. The registers of bank 320 are arranged and connected with a set of spring jacks in a manner identical with that heretofore described in connection with banks 260 and 261. This double bank, however, contains the auxiliary registers $J^3X$, $J^3Y$, $J^3Z$ and $J^3T'$, the three specific registers of this auxiliary group being each connected with the auxiliary spring jacks 322B, 323, 324 and 325. If now, for example, workman A, who is hired and normally employed in department No. 1, does work on job 320 in department No. 2, his plug $P_a$ will be inserted in one of the spring jacks 324, whereupon the current impulses delivered through $P_a$ will flow through spring jack 324, the electromagnet winding of the auxiliary register $J^3Y$, the electromagnet winding of the auxiliary total register $J^3T'$, thence through cord 326 and plug 327 connecting with the registers of bank 320. The plug 327 can, of course, be inserted in other departmental job jacks, thus affording additional cost details in any department, as desired. These current impulses will, therefore, flow not only through the job cost registers of bank 320 and, thence, through the generic registers, as previously described, but will flow also in series through the auxiliary register $J^3Y$ and the auxiliary total register $J^3T'$. The cost of the labor represented by the flow of these impulses will appear in register $J^3W_1$, but it will appear also in the auxiliary register $J^3Y$, thus indicating that, although the work was done by a man normally employed in department No. 1, the work was in reality done in department No. 2, the auxiliary register $J^3Y$ being assigned to such items.

If it be assumed, for example, that department No. 1 is the machine shop department in which A, B and C are normally employed and, if on a particular job it is desired to separate the wages paid for lathe work from the wages paid for milling machine work and for bench work, a double bank of registers such as 320 and 320' will be assigned to this particular job, whereupon, A, who is a lathe hand, will be plugged into one of the jacks 323; B, who is a milling machine hand, will have his plug inserted into a spring jack 324 when employed on job 320, and C, when employed on this job, will have his plug inserted in a spring jack 325, with the result that register $J^3Z$ will show the cost of the lathe work, register $J^3Y$ will show the cost of the milling machine work, and register $J^3X$ will show the cost of the bench work. If two lathe hands in department No. 1 are engaged in lathe work in department No. 1, on job 320, both of their plugs will be inserted in the spring jacks 323, etc. These auxiliary registers will give, therefore, an unusually detailed analysis of the labor cost of the particular job 320, and the totalizing register $J^3T'$ will indicate the total of the labor cost accummulated in the auxiliary registers $J^3X$, $J^3Y$, and $J^3Z$. In addition to the detailed exhibition of these subdivided labor costs in department No. 1, the register $J^3W_1$ of bank 320 will show the labor costs in department No. 1 as before. It is apparent that any number of total job cost banks may be provided, as illustrated at 320 and 320', or, in fact, all of the banks could be of this type, if desired. Fig. 1 is intended to represent typical arrangements which may be duplicated in any desired number or combinations.

One of the items of cost of production of any job may be that involved in the cost of maintaining and running machines. The cost of operating a machine may be calculated by considering interest on investment, depreciation, power required to drive it, etc. After the cost of maintaining and operating the machine has thus been determined, the machine may be regarded, in so far as the cost of producing the work is concerned, as being paid wages analogous to the wages paid workmen.

In accordance with my invention, the cost of maintaining and operating some or all of the individual machines is calculated and these items of production expense are charged against the several jobs upon which the machines may be employed, as "machine wages".

I shall now describe the mechanism whereby these machine wages at predetermined rates are charged automatically against the jobs upon which the machines may be employed.

Fig. 1 illustrates the accounting mech sponding similarity in the branch circuits which effect the distribution of the cost of machine wages to the several jobs. Thus, the plug $P_g$ is used by the operator in plugging into spring jacks assigned to the job upon which the machine G may be employed. If, for example, this plug $P_g$ be inserted in one of the spring jacks $263W_m$, current impulses, and in a branch circuit from the appropriate main impulse circuit, will flow from the plug $P_g$, through a spring jack $263W_m$, job machine-wage register $J^2W_m$, the energizing coil of the job totalizing register $J^2T$, thence through bus-wire 332, one of the electromagnets of the mechanically differential register $J^2W_m$, the single energizing coil of register $JW_m$, one of the two electrically differential windings of register $M_w$, and thence to the appropriate segment of the departmental job cost selector 290 with which, at the appropriate time, the brush of this selector makes electrical connection to return the current impulses to the negative pole of the battery 103 over a circuit identical with that previously traced in connection with the branch job cost circuits which handle the items of job cost due to the payment of workmen's wages. The plugs assigned to the other machines will in like manner be plugged into the appropriate spring jacks of the job banks assigned to the jobs upon which the machines may be employed from time to time, the shifting of the plug connections from spring jack to spring jack being made by the operator or foreman in conformity with the shifting of the machine from one job to another.

As a result of this arrangement, the machine-wage register of each job bank will show at all times the amount of machine-wage cost of the particular job to which the bank is assigned. So also, the items of machine cost will be included in the job total cost registers $J'T$, $J^2T$, $J^3T$, etc.

Another item of cost entering into the production of most jobs will be that of material supplied and used in the manufacture of the article or articles comprising the "job." In accordance with my invention, I provide means for indicating upon appropriate material registers of several job banks the value of the material entering into the jobs. The material registers of the several job banks are shown at $J'M$, $J^2M$ and $J^3M$. At MC I have shown a material controller which is identical with the mechanism illustrated in detail in Fig. 6.

At SM, I have shown the material setting device, which consists essentially in a register driving wheel like the wheel 81 illustrated in Fig. 6, this wheel being turned manually by a crank 333. When the stock clerk issues material of a given value for use on, say job 261, he fastens a register mechanism identical with any one of those illustrated in Fig. 3 upon the material setting device SM and turns the crank 333 until the register exhibits in figures the value of the material less one cent. Thus, if the material had a value of 79 cents, the register would be set to read 000078. After the register has thus been set to the appropriate amount, it is removed from the setting device SM and brought into position in association with the material controller MC in a manner identical with that illustrated in Fig. 6. The material plug $P_m$ is then inserted into one of the spring jacks $263M$, whereupon, current impulses flow from the positive pole of the battery 103, through wire 334, general impulse commutator 335, wire 336, the single electromagnet coil of the material controller MC, the contact springs 84 and 83 of material controller plug $P_m$, spring contact $263M$, the electromagnet winding of the material cost register $J^2M$, total job cost register $J^2T$, the material bus-wire 337, one of the electromagnets of the mechanically differential register $J^2M$, the single electromagnet winding of the register $JM$, one of the two electromagnets of the mechanically differential register MS, and thence through wire 338 and wire 112, back to the negative pole of the battery 103. Impulses will flow through this circuit as long as the circuit is maintained at MC. The closure of the circuit would continue, however, only until the register attached to the material controller MC has been returned to its 000000 position, and one step beyond, in which further position the register will read 999999. As explained in connection with Fig. 6, the contact controlling spring 85 will drop into the notch 43 in the cam associated with the numeral wheel of highest order, whereupon the electrical connection between the contact springs 83 and 84 will be opened. The opening of this circuit will prevent further impulses from flowing through the circuit and the electromagnets last described, and thus the number of impulses permitted to flow through this material circuit will be one more than the amount for which the discharging register was set. It will be remembered that this register was set for one cent less than the value of the material. The value of the material was assumed to be 79¢ and the setting of the discharge register in coöperation with the material controller MC will cause 79 impulses and no more to flow through the material circuit described.

If the material had been issued for use on job 260, the plug $P_m$ would have been inserted into a spring jack $262M$ connected with job bank 260. If the value of the material issued to the job were greater or less than 79 cents, the discharge register would have been set to indicate the value one less than the value of the material to be charged.

In order that the current impulses which are caused to flow on account of the material issued and to be charged may not coincide in time with the current impulses which flow through the job total cost registers on account of workmen's wages and machine wages, the position of the metal segment of the general impulse commutator 335 is angularly displaced relative to the metal segments of the main impulse commutator 120 and the auxiliary impulse commutator 245. As a result of this angular displacement, the current impulses controlled by these three impulse commutators flow at different time periods, as a result of which there are no coincident impulses of current flowing simultaneously through any register actuating magnet. As soon as the current impulses corresponding with the value of material issued to the several jobs flow through the job total cost registers J′T, J²T, J³T, etc., these job total cost registers will add the value of the material in calculating automatically the total job costs.

In accordance with my invention, I provide automatic means for calculating and indicating at all times the value of material in the store-house or store-room and not as yet issued for use on particular jobs. Assuming that there is no material in the stock-room, at the beginning it will be necessary to stock the store-room. Whenever material of any kind is delivered to the store-room, the value of the material thus delivered is set up by means of the setting device SM upon a discharge register, which is then transferred to the material controller MC. The plug $P_m$ is then inserted into a material spring jack 340. Current impulses controlled by the commutator 335 and limited in number by the material controller MC will then flow from the plug $P_m$ through spring jack 340, wire 341, one of the electromagnets of the mechanically differential register MS, thence through one of the electromagnets of the mechanically accumulative register TC, thence through the single electromagnet of register MT and thence through wires 338 and 112, back to the negative pole of the battery 103.

All of the material delivered to the store-room is accounted for in the register circuits in this manner. We have now proceeded far enough to describe a typical example of the purpose and function of some of the more generic registers. It will be remembered that whenever material is delivered to the storeroom, current impulses corresponding to its value are delivered over a circuit which includes the single electromagnet winding of the material total register MT. This register will, therefore, be advanced in such manner as to indicate at all times the total value of material delivered to the storeroom. Any current impulses which flow through the total material register MT will flow also through one of the electromagnets of the mechanically differential register MS. This register is mechanically differential in the sense illustrated in detail in Fig. 7, that is to say, a current impulse flowing through one of the two electromagnets will advance the numeral wheels of the register one step, whereas a current impulse flowing through the other electromagnet will turn the numeral wheels of the register one step in the backward direction. The fact that the actuating mechanism of this register MS has two separate electromagnets and the differential gearing is diagrammatically represented in Fig. 1 by a small differential gear at the side of the rectangle and by two electromagnet windings. It will be remembered that in tracing the flow of the current impulses delivered whenever material was issued from the storeroom and charged to any job, the impulses passed always through the other electromagnet of the actuating mechanism of the mechanically differential register MS. This register MS is always advanced by an amount corresponding with the value of material delivered into the stock-room and is from time to time turned backward by an amount corresponding with the value of the material issued from the stock-room for use on the several jobs. On account of the mechanically differential connection between the actuating magnets and the numeral wheels of the register, the register itself will indicate always the difference between the value of the material delivered to the storeroom and the value of the material issued from the storeroom. In other words, this register will indicate at all times the value of the material in stock in the storeroom. The letters MS have been chosen to indicate that the register thus marked shows at all times the value of the "material in stock."

There is one other typical item of production cost which the circuit drawing of Fig. 1 has been arranged to illustrate, namely, those items of general overhead expense commonly described as "burden." These may include rent of building, heat, light, power, interest, depreciation, insurance, superintendence, janitor service, salaries of officers, etc. Accountants will differ as to which of these and similar items had best be included in calculating cost of production. For example, some accountants would charge certain of these items against sales expense rather than against production expense, while other accountants would prefer to charge the same items of expense against cost of production. Whatever may be the policy of the accounting head of the establishment as to the manner in which these items of overhead expense are to be charged, the mechanism of my invention provides for their automatic distribution between the several jobs.

The accounting head of the establishment can determine from knowledge and experience the amount of the fixed burden which is to be charged as production cost. He will know, for example, that the rate is so much per year. He will know the amount of the insurance and the amount of the salaries paid officials and superintendents. He can make a careful estimate based on past experience of the annual cost of heating, lighting, etc. Having thus determined the amount of this fixed burden, he will calculate the amount of the fixed burden per hour. If he finds, for example, that this burden amounts to 110 cents per hour, he will connect three of the wires of the cable 349, one with the rate bus-bar $W_{60}$, another with the rate bus-bar $W_{40}$ and another with the rate bus-bar $W_{10}$. The cable 349 consists merely of a convenient number of wires by means of which the various segments of the general burden selector 350 may be connected with appropriate rate bus-bars in order that the total of the rates per hour as determined by the selected bus-bars may equal the amount of the fixed burden to be distributed each hour. We may assume that the three wires of the cable which are connected at one end with the several rate bus-bars are connected at their other ends with the segments 351, 352 and 353 of the general burden selector 350. A number of current impulses corresponding with the hourly rate of fixed burden, as determined by the connections of the terminals of the wires of the fixed burden cable 349, will be caused to flow through a part of the burden reservoir mechanism already alluded to over a circuit which may be traced as follows: from the positive pole of the battery 103, through main impulse commutator 120, wire 121, rate-bus-bar $W_{60}$, a wire of cable 349, segment 351 of selector 350, the brush of selector 350, wire 370, one of the differentially wound electromagnet windings of the mechanically and electrically differential undistributed burden register UB, one of the electromagnets of the mechanically cumulative total cost register TC, the electromagnet winding of the fixed burden register FB$e$, the single winding of the fixed burden electromagnet FB, wire 154, brush 155, the metal segment of commutator 156, brush 157 and wires 158 and 112, back to the negative pole of the battery. Current impulses will flow over similar circuits except for the particular wire of the fixed burden cable 349, and the particular segments of selector 350, to take care of the impulses which must flow on account of the connections with the rate bus-bars $W_{40}$ and $W_{10}$. The main purpose in causing the flow of these impulses is to "pump" into the burden reservoir mechanism the amount of the fixed burden as it accrues hour by hour.

Before attempting to describe the fixed burden reservoir mechanism, I shall refer to the mechanism for taking care of that item of burden which results from the fact that some of the workmen and machines will be idle at times, as, for example, a workman may be idle for a few minutes between the time when he completes one job and the time when the foreman puts him to work on a new job. Some of the machines may be idle for long periods of time when there is no work of a nature to be performed upon those machines. These items of so-called "waste wages" are a part of the expense which can best be distributed in the form of an overhead or burden charge.

I have heretofore described the flow of the current impulses which actuate the individual wage registers and the individual machine-wage registers. It will be remembered that these current impulses will in all instances return to the negative pole of the battery over a circuit which was traced in part through wire 212, one of the differentially connected windings of the mechanically and electrically differential undistributed burden register UB, wire 213, one of the electromagnets of the mechanically cumulative total cost register TC, wire 214, electromagnet winding 215, and, thence, through one departmental selector path or another to wire 154, and, thence, through commutator 156 back to the negative pole of the battery. All of the current impulses flowing through the individual wage registers and the individual machine-wage registers thus flow through electromagnet winding 215.

This electromagnet winding 215 is one of two differentially connected electromagnet windings mounted upon the electromagnet core whose armature acts through suitable pawl and ratchet mechanism, like that illustrated in Fig. 7 to rotate step by step in the direction of the associated arrow a beveled driving gear 390. This beveled gear 390 is a part of a differential gear set having a driven gear 391 and another beveled driving gear 392, which beveled driving gear 392 is advanced step by step in the direction of the associated arrow by means of the fixed burden electromagnet FB$e$, the combination of the electromagnet having the windings 215 and 302, the gears 390, 391, and 392, and the electromagnet FB$e$, forming a unit substantially like that shown in Fig. 7 except that the driven gear 391 of the differential gear set, instead of being connected with a register, as shown in Fig. 7, is connected directly or through an idler with another beveled driving gear 393 of another differential gear set, whose driven gear 394 is connected through an appropriate spindle with units numeral wheel of the burden reservoir register 395. The other beveled driving gear, which with 393 acts to rotate the driven gear 394, is shown at 396. This driving gear 396 is actuated by a discharge magnet DM, which has a single electromagnet winding in the burden discharging circuit, subsequently to be described. The mechanism represented at 393, 394, 396 and DM is an obvious adaptation of mechanism such as is shown in Fig. 7 and need not be further described. The construction represented at 395 may be regarded as identical with that of any one of the register mechanisms shown, for example, in Figs. 2 and 3, except, as a matter of fact, that there is no necessity for the figures on the peripheries of the numeral wheels. The important thing is that one or more of the numeral wheels, and preferably not including the numeral wheel of lowest order, be provided with cams like that shown at 42 in Fig. 2, except that the cam instead of being provided with a notch, as at 43, is provided with a projection, as indicated at 397 in Fig. 1, and which projection should preferably extend over a considerable arc around the periphery of the cam of which it forms a part. When the cam 397 engages the projection on the lower side of the electrical contact spring 398, this contact spring is raised to make engagement with the contact spring 399. Before describing the function of these contact springs, I wish to describe further the operation of the electromagnets of this burden reservoir mechanism. We have seen that all of the wage impulses flow through the electromagnet winding 215, these impulses, if not neutralized, acting through the associated armature and ratchet mechanism to advance the numeral wheels 395. These wage impulses will, however, be neutralized in their electromagnetic effects whenever the workmen or machines are employed in productive work. This comes about as follows: Whenever the workmen or machines are employed on particular jobs, the plugs such as $P_a$ and $P_g$ are inserted in spring jacks assigned to the jobs. When these plugs close their branch circuits, current impulses corresponding in number with the current impulses which flow through the wage registers of the active men or machines flow through the electromagnet winding 302 just before the impulses flowing through these branch circuits join the main impulse circuit through wire 154. The electromagnet windings 302 and 215 are wound upon the electromagnet core in opposite directions and, since any current impulses that flow through winding 302, flow simultaneously with the impulse of current through winding 215, the two impulses will neutralize each other in so far as their electromagnetic effects are concerned, the two windings being given such number of turns as will effect this neutralization. When, therefore, any workman or machine is idle, the electromagnet winding 215 alone will be energized, thereby causing a one-step advancement of the numeral wheels 395 of the burden reservoir mechanism. When any workman is engaged upon a productive job, however, the wage impulse, which would advance the reservoir mechanism is neutralized in its magnetic effects by the corresponding job cost impulse, with the result that the burden reservoir mechanism will not be advanced.

The result of this arrangement is that I pump into the numeral wheel set 395 of the burden reservoir mechanism a sufficient number of one-step advancements to correspond with the amount of wages paid idle workmen and idle machines.

This item of burden due to the necessity for paying idle workmen and idle machines is, through the operation of differential gear set 390, 391, and 392, added to the fixed burden which is put into the burden reservoir mechanism by means of the electromagnet $FB_e$, so that there is a substantially continuous, but nevertheless somewhat variable, tendency, to advance the numeral wheel mechanism 395 of the burden reservoir mechanism. It may be well to call attention to the fact that if the accountant finds from time to time that he has incorrectly estimated the cost of certain items of fixed burden, as for example heating and lighting, he may change the connections of the wires of the fixed burden cable 349 to correct the rate of fixed burden charge in order that the amount of fixed burden pumped into the burden reservoir mechanism may at the end of a fiscal period, such, for example, as a year, come out in substantially exact conformity with the actual cost of the items of fixed burden.

I have yet to describe the operation of the mechanism which acts to distribute the accuring burden between the several jobs. The electromagnet 115 is energized during the fifty or fifty-five seconds of each minute during which the motor 100 runs. If, at the beginning of a minute, the pointed cam on the end of the contact spring 398 is in the open circuit position shown in Fig. 1, the armature of the electromagnet 115 will be attracted to hold this contact spring in its open position during the time that the motor 100 runs. During this first minute, a certain amount of fixed burden will be pumped into the numeral wheel mechanism 395. If the amount of burden, whether fixed or variable, which is pumped into the numeral wheel mechanism 395 during the first minute is sufficient to turn the numeral wheel of, say the hundreds order, the cam 397 will raise the switch spring 398 as soon as this switch spring has been freed from the holding influence of the armature of the electromagnet 115. When, therefore, at the beginning of the second minute, the clock causes the motor 100 to start, the armature of the electromagnet 115 will be attracted, but this time it will hold the switch spring 398 in its circuit closing position. When this switch spring 398 is thus caused to close circuit with the spring 399, the accumulated burden charges or part of the accumulated burden charges will be distributed to the several jobs. In tracing the circuits over which the burden is distributed, it will be convenient to trace the circuits from the negative pole, rather than from the positive pole, of the battery. These burden distributing impulses may be traced from the negative pole of the battery 103 through wire 112, wire 158, brush 400, the segment of commutator 156, brush 401, wire 402, the brush of departmental burden selector 360, segment 361, wire 403, one of the differentially connected windings of the mechanically and electrically differential undistributed burden register UB, wire 404, switch spring 398, switch spring 399, winding of DM, wire 405, electromagnet winding of the distributed job burden totalizing register JB, one of the electromagnets of the mechanically differential register J$^p$B, wire 406, and (assuming that plug P$_a$ is inserted in spring jack 262), thence through the winding of the job cost totalizing register J'T, thence through the winding of the individual job burden register J'B, spring jack 262B, tip of plug P$_a$, segment 271' (see Fig. 8) of burden plug selector 270', wire 266, cutout commutator 267, wire 268, brushes 335$b$ of the general impulse commutator 335, wire 264, wire 190, to the brush of selector 180, segment 181, wire 171, to the upper switch blade of the in-and-out switch assigned to workman A, rate bus-bar W$_{20}$, rate commutator 124, wire 407, switch blade 408, wire 409, cut-out commutator 410, wire 411, auxiliary impulse commutator 245, and thence through wire 104 back to the positive pole of the battery 103. After the burden distributing current impulse has flowed over the circuit just traced, the selector mechanism will be advanced one step, whereupon another burden distributing current impulse will flow over a circuit identical with that just traced except that it will flow through the circuit determined by the spring jack into which the job plug of workman B is connected. Upon the next succeeding one-step advancement of the selector mechanism, another burden distributing impulse will flow over a circuit determined by the identity of the spring jack with which the job plug assigned to workman C is connected. In like manner, other burden distributing current impulses will flow through other job circuits as the selector mechanism connects-in the several workmen and machines.

The cut-out commutators 267 and 269 are similar to cut-out commutators 410 and 248 respectively, and are mounted upon a shaft running one revolution per hour and in synchronism with the last-mentioned commutators. The cut-out commutator 267 opens the burden circuit through wire 266 the one minute of each hour when the fractional cent entries are being made and the cut-out commutator 269 closes the circuit between wires 268 and 265 during this minute so that at this time the fractional-cent impulses may be transmitted over wire 265 as the brushes 335$b$ and 245$a$ are closed simultaneously. The brushes 245$b$ and the brushes of the impulse commutator 120 are closed simultaneously. The brushes 245$b$ always transmit the main impulse, sent out from impulse commutator 120 over wire 265 to the wage plug selector 270. The brushes 335$b$ transmit the burden impulses sent out from the auxiliary impulse commutator 245 during the remaining fifty-nine minutes of each hour over wire 266 to the burden plug selector 270' and during the other minute of each hour when the impulses are used for giving the fractional cents over wire 265, the cut-out commutator 269 makes the proper connection during this minute to the wage plug selector 270. In other words, the second set of brushes 245$b$ and 335$b$ associated with the interrupters 245 and 335, respectively, are arranged to permit the passage of impulses alternately to wage plug selector 270 and burden plug selector 270', while the cut-out commutators 267 and 269 direct all of the impulses during one minute of each hour to the wage plug selector 270 and during the remaining 59 minutes permit the division of the impulses alternately between the wage and burden plug selectors 270 and 270' respectively.

Fig. 8 shows in detail the arrangement and connections of the wage plug selector 270 and the burden plug selector 270'. These two selectors and their brushes, while shown side by side, are electrically insulated from each other. Similar segments of each selector are connected by means of a two-conductor cord to the same plug. The segments of the wage plug selector are connected to the sleeves of the plugs, and the segments of the burden plug selector are connected to the tips of the plugs. The connection, as shown in Fig. 1, of wire 266 to the burden plug selector is shown by the dotted extension of this wire which leads to the brush of this selector, and the cord conductors from the segments of this selector are also shown in dotted lines connected to the tip of the plugs, all of which is shown in more detail in Fig. 8. The jacks as shown in Fig. 8 for each job have their tip springs commoned for connection to the job burden register while the sleeve terminals are classified by departments and connected with the several departmental wage registers. In Fig. 1 the commoning of the tip springs of the set of jacks associated with each of the various jobs is shown by plates 262B, 263B, etc., while the departmental grouping and multiple connecting of the sleeves of the jacks is clearly shown by the jack strips in front of these plates.

It will be apparent from the description thus far that the flow of the burden distributing impulses depends upon the closure of a circuit through a rate commutator such as 123, 124 or 125. If, therefore, a workman's wage circuit is connected with the sixty cent rate bus-bar $W_{60}$, a cent of burden may be distributed every time that he is credited with one cent in wages. If, however, the workman's wage circuit is connected with the twenty cent rate bus-bar $W_{20}$, a burden distributing current impulse can be discharged only during every third minute of time during which third minutes the workman is credited with one cent in wages.

It will be apparent also that if two workmen, earning a given rate of wages are employed upon one job, that job will be charged with a larger part of the distributed burden than would be the case if only one man were employed upon that particular job. Thus, it will be seen that the burden is distributed among the jobs approximately in the same proportion as the job is charged with the total of productive wages and machine wages.

In wire 405, through which all of the burden impulses are discharged, is connected the winding of the electromagnetic actuator DM, this electromagnetic actuator DM being substantially like those illustrated in Figs. 2, 5, 6, and 7. Its armature and ratchet mechanism serve to rotate the beveled driving gear 396 step by step in the direction of the arrow applied to this driving gear, the driving gear 396 being advanced one step upon the discharge of each burden impulse through the wire 405. It will be remembered that the fixed burden electromagnetic actuator and the actuator upon which the coils 215 and 302 are wound act cumulatively to rotate the driven gear 394 in one direction. The tendency of the discharge magnet is to rotate the driven gear 394 in the reverse direction. If the driving gears 393 and 396 are simultaneously advanced one step in opposite directions, the driven gear 394 will remain stationary. If the discharge magnet DM is energized by more effective impulses than are the magnet $FB_e$ and the variable burden magnet $VB_e$ upon which the coils 302 and 215 are differentially wound, then the driven gear 394 of the differential gear set and the numeral wheel mechanism 395 of the burden reservoir mechanism will be rotated in a backward direction. It will be apparent that the burden impulses may be discharged at a high rate as compared with the rate at which the fixed and variable burden will be pumped into the burden reservoir mechanism. The result is that shortly after the switch contact 398 is forced into its circuit closing position and there held by the armature of the electromagnet 115, the stored burden will have been discharged, which discharge of the stored burden will return the numeral wheel mechanism 395 to a position such that the switch spring 398 will not be forced by the cam projection 397 into contact with the switch spring 399. In order that the distribution of the burden may be closely proportional to the job wage costs, it is desirable to provide the electromagnet 115 with its armature which causes the burden to be distributed throughout the whole of any one minute in case such burden distribution is commenced at the beginning of the minute. If these provisions were not made, there would be a tendency to distribute an unduly large proportion of the burden to the jobs upon which were employed the workmen whose wage and job-cost circuit are among the first to be actuated in each minute. The locking of the switch spring 398 in its lower position or in its upper position throughout the whole of each minute, as the case may be, in no way interferes with the rotation of the numeral wheel mechanism 395, the switch arm 398 being made flexible with this end in view. The cam or cams 397 which control the closure of the burden discharging circuit are preferably placed upon one or more, of the numeral wheels above the lowest order or orders, in order that the discharge of burden impulses will not begin until there has been a storage of sufficient burden to permit the discharge of at least one burden impulse during each step of the selector to which the job connecting plugs are connected.

If the switch 408 is in the position shown in Fig. 1, the distribution of burden will be approximately proportional to the total wages of the men and machines employed upon the several jobs. The burden may, however, be distributed in accordance with other plans, as, for example, in proportion to the number of men and machines employed upon the several jobs. If it is desired to distribute the burden in conformity with this later plan, the switch 408 will be moved into position to make connection with the switch contact 420. When the switch 408 is connected with contact 420, all of the rate controlling mechanism will be short-circuited out of the job distributing circuits so far as the flow of the burden impulses is concerned, whereupon the current impulses which we have previously traced from the negative pole of the battery 103 would flow from the discharge controlling switch 398 and 399 through wire 405, wire 406, and the electromagnets of the several job banks to springs jacks, as, for example, 262B, 263B and 322B, thence to the tip of plugs such as $P_a$, $P_d$, $P_g$, thence through segments 271', 274' and 277' (see Fig. 8) and the brush of burden plug selector 270', wire 266 cut-out commutator 267, wire 268, brushes 335b of the general impulse commutator 335, through wire 264 directly to contact 420, thence to switch blade 408, and thence through wire 409 and the cut-out commutator 410, as previously traced, back to the positive pole of the battery. When, therefore, the switch 408 is in the alternate position last described, the flow of burden impulses will be distributed between the several jobs in proportion to the number of men or jobs employed upon the several jobs and not in conformity with the total of wages entering into the labor cost of the several jobs.

Various other schemes of burden distribution can be applied by use of the principles herein described.

It may be well at this point to call attention to the fact that the auxiliary impulse commutator 245 serves a double purpose of controlling the production of the burden impulses and also the fractional-cent impulses. The insulated segment in the periphery of the cut-out commutator 410 completely opens the burden discharging circuit or circuits at the time that the commutator 248 closes the fractional cent circuit in order that there may be no confusion between burden impulses and fractional-cent impulses. The connector commutator 156 has such an angular position upon the motor shaft 100 with respect to the angular positions of the impulse commutators 120 and 245 that it will prevent confusion between the wage and labor cost impulses and the burden impulses.

If all of the burden for the whole plant were accumulated in and discharged from a single burden reservoir, then, all of the segments of the departmental burden selector 360 would be connected in common with wire 403 as shown in Fig. 1. I have indicated, however, that segments 361, 362, and 363 are connected in one group, while the other segments may be connected together in groups corresponding with the grouping elsewhere adopted and which grouping is in conformity with the assumption that workmen A, B and C are employed in department No. 1, workmen C, D, and E in department No. 2, and with the assumption that the machine-wages and machine-wage costs are to be considered as in another department or class.

If it be desired to apportion the fixed burden between the several departments and to charge the jobs in progress in each department with the whole of the variable burden accruing in that department but in no other, then, I provide a burden reservoir mechanism for each department and duplicate the mechanism necessary to pump into each burden reservoir mechanism the proportional part of the total fixed burden. Then I modify the circuit arrangements in an obvious manner, such as will cause the variable burden accruing in each department to be pumped into the particular burden reservoir mechanism assigned to that department and no other. When duplicate reservoir mechanisms are thus provided for each department, the burden impulse discharged under the control of each departmental burden reservoir mechanism will be discharged through circuits such as will cause the burden distributed under the control of each burden reservoir mechanism to be charged and distributed entirely among the jobs in process in that particular department. The departmental distribution of the burden is effected by connecting the departmental groups of the segments of the selector 360 through separate and individual wires (corresponding with wire 403), each with its own burden reservoir mechanism.

At 430 I have indicated a job erasing actuator. This consists essentially of a bank of electromagnetic actuators such as shown in Fig. 2, modified, however, as illustrated in Fig. 6. The connections of the several electromagnets are illustrated in Fig. 1.

When any job has been completed, the bank of registers, as, for example, that illustrated at 260, is removed from the actuator mechanism in the manner described in connection with Figs. 2, 3 and 4 and brought into operative connection with the bank of erasing actuators illustrated at 430. An erasing impulse plug EP is then inserted in the spring jack 431 connected in multiple with the electromagnets of the bank 430. Current impulses will flow over the circuit thus closed at plug EP at a high rate, whereby each of the registers connected with one of the electromagnetic actuators of the bank 430 will be returned quickly to its zero position and one step beyond. In order to prevent automatic accounting errors due to the extra impulse thus automatically sent through each actuator mechanism, it is desirable upon removing a bank of registers from a bank of job actuators to return each register one step in a backward direction by hand. This can be done easily by pulling the locking member 52 downwardly by hand and then turning the units numeral wheel of each register one step in the backward direction. If this is done before the bank of registers is fastened in position upon the automatic erasing bank 430, the number of current impulses permitted to flow through each actuator will be limited to a number corresponding with the amounts shown upon the several registers upon their removal from the job actuator banks. The current impulses flowing through the erasing actuator magnets will be returned to the negative pole of the battery 103 over circuits which are sufficiently clearly illustrated in Fig. 1 of the drawing. In order that the desired accounting results may be secured, the banks of registers assigned to all jobs in process are re-set by means of this automatic erasing mechanism as soon as the respective jobs are finished.

If it is desired to show the total cost and the analysis of the total costs of producing the several finished jobs, a bank of actuators equipped with a bank of totalizing registers may be connected in series with the electromagnets of the erasing actuator 430 with the result that the registers of this totalizing bank will show at all times the totals of all job registers which are cleared or erased.

A similar bank of erasing actuators is ordinarily installed to erase the wage registers at the end of each payroll period.

One of the most valuable results attained in the use of my invention is the current showing upon appropriate registers of a great variety of generic totals, differences or results, by means of which the manager of an establishment may at all times have a comprehensive, but still exact, knowledge of the condition of his production plant. In illustrating these generic registers, I have indicated each register on Fig. 1 by means of a rectangle and have adopted a code of symbols to indicate on Fig. 1 the nature of the electromagnetic actuating mechanism associated with each such register. Where the actuator mechanism is provided with two separate electromagnet cores and armatures, as illustrated in Fig. 7, I have shown a set of bevel gears and wherever they appear at least two separate electromagnets are required. All of the rectangles which represent mechanically differential actuators are provided with a small representation of a differential gear set and where the differential gearing is arranged, as in Fig. 7, to cause the electromagnet armatures to act in opposite directions upon the register mechanism, I have shown one of the two driving gears of the differential set in dotted lines.

If the idler gear 67 of Fig. 7 were omitted, the differential gearing would cause the two electromagnet armatures to act cumulatively upon the register mechanism and, where such a device is employed, both driving gears of the differential gear set in Fig. 1 are shown in full lines. In some instances, two energizing windings are wound upon a single core and, in such cases, the two windings are connected, as required, either differentially or cumulatively in so far as their magnetic effects are concerned. Where there are two differentially connected windings upon the same electromagnet core, one of the two windings is indicated by a loop in full line and the other by a loop in dotted line.

The total cost register TC is provided with three actuating electromagnets, all of which act cumulatively in driving the numeral wheels of the associated register in forward direction. I have indicated this by showing the three windings in full lines and have illustrated diagrammatically total alining differential gear sets. The differential gearing of the actuator mechanism of the register TC will differ from that of the burden reservoir mechanism merely in the fact that all of the ratchets and actuating pawls will operate in such directions as to advance the register mechanism in conformity with the total of impulses flowing through all three of the electromagnets.

The undistributed burden register UB is provided with three electromagnet cores. The two electromagnet windings shown at opposite ends of the large rectangle are electrically differentially connected and are wound upon one of the cores, the armature of this core being provided with a pawl and ratchet tending to advance the associated register mechanism. The electromagnet winding at the lower left-hand corner is wound upon another core, whose armature and ratchet mechanism act also through the differential gearing to advance the register mechanism. The electromagnet coil at the lower right-hand corner is wound upon still another core, which core is provided with armature and ratchet mechanism such that its energization will act through the differential gearing to turn the register mechanism backward. The differential gearing of this undistributed burden register will be like that shown at 391, 394, etc.

I have traced the flow of current impulses sufficiently to enable one now to see that the various generic registers will show certain results, as follows:

Register MT, as previously explained, shows the value of all material put into the storeroom or stockroom.

The register associated with the fixed burden electromagnet FB₀ will show at all times the total of fixed burden pumped into the burden reservoir mechanism.

$WT_1$ shows the total of wages earned by workmen in department No. 1.

$WT_2$ shows the total of wages earned in department No. 2.

MW shows the total of machine wages earned.

TC shows the total of the indications in registers MT, $FB_e$, $WT_1$, $WT_2$ and MW, in other words, the total expenses of the production plant.

MS shows the difference in the value of material delivered to the stockroom and material issued from the stockroom for use on the several jobs, in other words, the value of material in store.

FB is a register of an actuator connected in series with the magnet of $FB_e$ and indicates that duplicate registers may be connected in series at any point in order to secure an indication of the same result or item in any number of places in the same establishment.

$Ww_1$ shows the total of wages earned by workmen in department No. 1, but which through faulty supervision or otherwise have not been turned to account in the production of any job, in other words, the waste wages in department No. 1.

$Ww_2$ is the waste wage register for department No. 2.

$M_w$ shows the machine waste wages.

UB is a register actuated forwardly in conformity with the total of fixed burden and variable burden delivered to the burden reservoir and actuated backwardly in conformity with the distributed burden, as a result of which arrangement, this register will show at all times the amount of the accrued, but as yet undistributed, burden.

JM shows the total value of all material issued for use on all jobs.

JB shows the total amount of burden distributed to all jobs.

$JW_1$ shows the total labor cost (wages) of productive labor in department No. 1; in other words, this register shows the amount of workmen's wages which in department No. 1 are charged directly to the several jobs in that department. This register does not, however, include wages which must be paid idle workmen.

$JW_2$ shows in like manner the productive labor cost in department No. 2.

$JW_m$ shows in like manner the productive machine wage cost of all jobs.

JT shows the total of JM, JB, $JW_1$, $JW_2$ and $JW_m$; in other words, the total cost of all jobs, both finished and in process.

$J^pM$ is provided with a differential actuator mechanism, one magnet of which advances the register mechanism to correspond with the total of material issued for use on all jobs, and the other of which tends to rotate the register mechanism in a reverse direction to effect a subtraction of the value of material issued to a particular job, this subtraction being effected whenever any job has been finished and its registers are cleared or erased in the bank 430. As a result, register $J^pM$ will show the value of the material issued to unfinished jobs, in other words, issued to jobs which are still in process.

$J^pB$ shows the amount of burden distributed to jobs still in process.

$J^pW_1$ shows the labor cost in department No. 1 of jobs still in process.

$J^pW_2$ shows the labor cost in department No. 2 of all jobs still in process.

$J^pW_m$ shows the machine-wage cost of all jobs still in process.

$J^pT$ shows the total productive cost of all jobs still in process.

I have lettered the actuator mechanisms of bank 430 to indicate that registers connected in series with these actuators would show certain results as follows:

$J^fM$ would show the value of material issued for use on all finished jobs.

$J^fB$ would show the amount of burden distributed to all finished jobs.

$J^fW_1$ would show the labor cost in department No. 1 of all finished jobs.

$J^fW_2$ would show the labor cost in department No. 2 of all finished jobs.

$J^fW_m$ would show the machine-wage cost of all finished jobs.

$J^fT$ would show the total production cost of all finished jobs.

The showings of these registers are substantially current. By an examination of these registers and others of like nature, which one skilled in the art will be enabled to provide from a consideration of the typical examples herein stated, the head of an industrial establishment is provided at all times with current generic showings of such results as will keep him closely informed as to the condition of the production plant, the generic results being shown by the various specific registers in all desired degrees of analysis and refinement.

I have not attempted in this patent specification, nor in the accompanying drawings, to describe or illustrate a system of such magnitude as could be used to advantage in a commercial plant. I have sought, however, to make the illustrations typical, thus enabling one skilled in the art to duplicate the circuits and mechanisms to such extent as would be necessary to meet the requirements of a particular establishment. Neither have I endeavored to illustrate all possible combinations and results. I believe, however, that the application of the principles indicated in the circuits and mechanism disclosed will enable an engineer, familiar with the arts most closely allied to that of my invention, to provide mechanism and circuit arrangements to show automatically upon appropriate registers any results or combinations of results which may be desired by the accountant in charge of a production plant.

There are a few details of the clock control to which I have not yet referred. If, for example, it is desired to operate after the regular closing hour, five p. m., or during the noon-hour, as provided for on commutator 110, it will be necessary to close the manual switch 500 in order to supply the clock 101 with current with which to control the magnet 106.

So also, it may be desirable at rare intervals to speed-up the rate of accounting in every branch and department. If such increased rate is required, the manual switch mechanism 102 and 108 will be shifted to the right to engage an alternate contact associated with the clock 101. It will be remembered that ordinarily the clock sends out a controlling current for a few seconds of every minute. Alternate mechanism is provided in the clock for sending out these controlling currents at more or less frequent intervals, as, for example, every forty seconds, and perhaps also every thirty seconds. If the switch 108 be brought into connection with the forty-second contact, the motor will be set in operation at the commencement of every forty seconds rather than at the commencement of every minute or, if the switch 108 be brought into electrical connection with the thirty second clock contact, then the motor would be started at the beginning of every one-half minute.

The motor should, of course, be provided with suitable rheostat mechanism, such that it would run at a higher rate of speed when started every thirty or forty seconds than when started at the end of each minute.

If the motor were started at the end of every forty seconds, instead of at the end of every minute, and if it were arranged to run as far during each such forty seconds as it is normally arranged to run during each minute, then all of the current impulses will flow at rates fifty per cent. higher than those heretofore considered. This may be regarded as desirable in case the factory is compelled to run on some special holiday. When the switch 108 is thrown into connection with the forty-second or thirty-second clock contact, the switch 501 is moved to its alternate position, such that the overtime connector 230 will be thrown out of commission, the overtime switches just below the rate-bus-bar remaining, therefore in the positions shown in Fig. 1.

What I claim as new and desire to secure by Letters Patent is:

1. An accounting system comprising a plurality of wage registers, workmen's job registers, burden job registers, a generic register associated with the burden and workmen's registers for each job, electromagnetic actuating mechanisms for said registers, circuits for said electromagnetic actuating mechanisms, a main impulse commutator forming a part of and controlling the circuits for said workmen's wage registers and workmen's job registers, a burden reservoir mechanism, a selector shaft, time-controlled mechanism for operating said impulse commutator and selector shaft, a source of current common to all of said circuits, and a plurality of selectors operated by said selector shaft to control the circuits for said electromagnetic actuating mechanisms.

2. In combination, a bank of superposed electromagnetic register-actuating devices, a plurality of registers to be operated by said actuating devices, a support for carrying said registers in superposed arrangement, means for locking the support with respect to the actuating devices to retain the registers in driven relation to the actuating devices, and means for locking each of the several registers in actuated position when the support is removed from the bank of electromagnetic actuators, said support comprising a sheet of metal bent to substantially U-shaped cross-section.

3. A register of the class described provided with a plurality of counters, a set of mechanically differential actuating mechanisms for said counters and a set of electrically differential actuators for said counters.

4. A register of the class described comprising a plurality of counters, a set of electromagnetically operated mechanical driving mechanisms for said counters and a set of electrically differential driving mechanisms for said counters.

5. In an accounting system the combination with a register adapted to totalize job costs and the like, a single differentially wound electro-magnet, an armature therefor, driving connections between the armature and the register numeral wheels, separate circuits in which the windings of the electro-magnet are included, and means for sending impulses over each of said circuits to effect entries upon said register, the impulses traversing said windings serving to offset each other when impulses corresponding to counter-balancing entries are simultaneously transmitted through said windings.

6. In an accounting system the combination with a register adapted to totalize job costs and the like, an actuating mechanism for said register comprising a single differentially wound electro-magnet, separate circuits in which the windings of the electro-magnet are included, and means for sending impulses over each of said circuits to effect entries on said register, the impulses traversing said windings serving to offset each other when impulses corresponding to balancing entries are simultaneously transmitted through said windings.

In witness whereof, I hereunto subscribe my name this 12th day of June, A. D. 1914.

WILLIAM J. CRUMPTON.

Witnesses:
A. G. McCaleb,
Mary A. Cook.